United States Patent
Henry et al.

(10) Patent No.: US 10,127,041 B2
(45) Date of Patent: *Nov. 13, 2018

(54) COMPILER SYSTEM FOR A PROCESSOR WITH AN EXPANDABLE INSTRUCTION SET ARCHITECTURE FOR DYNAMICALLY CONFIGURING EXECUTION RESOURCES

(71) Applicant: VIA Alliance Semiconductor Co., Ltd., Shanghai (CN)

(72) Inventors: G. Glenn Henry, Austin, TX (US); Rodney E. Hooker, Austin, TX (US); Terry Parks, Austin, TX (US); Douglas R. Reed, Austin, TX (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/371,452

(22) Filed: Dec. 7, 2016

(65) Prior Publication Data

US 2017/0161036 A1   Jun. 8, 2017

Related U.S. Application Data

(63) Continuation of application No. 15/337,140, filed on Oct. 28, 2016.
(Continued)

(51) Int. Cl.
*G06F 17/50* (2006.01)
*G06F 9/30* (2018.01)
(Continued)

(52) U.S. Cl.
CPC .......... *G06F 9/3016* (2013.01); *G06F 3/0604* (2013.01); *G06F 3/0631* (2013.01);
(Continued)

(58) Field of Classification Search
CPC .... G06F 9/3001; G06F 9/3877; G06F 9/5066; G06F 9/30134; G06F 9/22; G06F 9/301;
(Continued)

(56) References Cited

U.S. PATENT DOCUMENTS 5,802,569 A   9/1998   Genduso et al.
5,819,097 A   10/1998  Brooks et al.
(Continued)

FOREIGN PATENT DOCUMENTS

EP   3179362 A1   6/2017

OTHER PUBLICATIONS

Jeronimo Castrillon Mazo et al., Programming Heterogeneous MPSoCs: Tools Flows to Close the Software Productivity Gap, 2013, [Retrieved on Sep. 24, 2018]. Retrieved from the internet: <URL: https://core.ac.uk/download/pdf/36570386.pdf> 224 Pages (1-224) (Year: 2013).*

(Continued)

*Primary Examiner* — Anibal Rivera
(74) *Attorney, Agent, or Firm* — McClure, Qualey & Rodack, LLP

(57) ABSTRACT

A compiler system that converts an application source program into an executable program according to a predetermined ISA executable by a general purpose processor. The processor includes a PEU that is programmable to execute a UDI. The compiler system includes a PEU programming tool that converts a functional description of a processing operation to be performed by the PEU of the processor into programming information for programming the PEU to perform the processing operation in response to the specified UDI. The compiler system includes a compiler that converts the application source program into the executable program, which includes an optimization routine that represents a portion of the application source program with the specified UDI and that inserts the UDI into the execut- (Continued)

able program, and that further inserts into the executable program a UDI load instruction that specifies the UDI and a location of the programming information in the executable program.

20 Claims, 10 Drawing Sheets

Related U.S. Application Data

(60) Provisional application No. 62/264,816, filed on Dec. 8, 2015.

(51) Int. Cl.
| | | |
|---|---|---|
| G06F 9/44 | (2018.01) | |
| G06F 9/50 | (2006.01) | |
| G06F 3/06 | (2006.01) | |
| G06F 9/38 | (2018.01) | |
| G06F 8/41 | (2018.01) | |
| G06F 9/22 | (2006.01) | |
| G06F 15/78 | (2006.01) | |
| G06F 9/28 | (2006.01) | |

(52) U.S. Cl.
CPC .......... *G06F 3/0673* (2013.01); *G06F 8/443* (2013.01); *G06F 8/447* (2013.01); *G06F 9/22* (2013.01); *G06F 9/28* (2013.01); *G06F 9/3001* (2013.01); *G06F 9/3017* (2013.01); *G06F 9/30043* (2013.01); *G06F 9/30174* (2013.01); *G06F 9/30181* (2013.01); *G06F 9/30185* (2013.01); *G06F 9/30196* (2013.01); *G06F 9/3836* (2013.01); *G06F 15/7867* (2013.01); *G06F 15/7871* (2013.01); *G06F 15/7892* (2013.01); *G06F 8/41* (2013.01)

(58) Field of Classification Search
CPC .......... G06F 9/30076; G06F 9/30145; G06F 9/30181; G06F 9/3004; G06F 9/30043; G06F 8/447; G06F 8/41; G06F 8/443; G06F 17/5045; G06F 9/3016; G06F 9/30; G06F 9/30; G06F 9/5044
See application file for complete search history.

(56) References Cited

U.S. PATENT DOCUMENTS

| | | | | |
|---|---|---|---|---|
| 6,138,229 | A * | 10/2000 | Kucukcakar | G06F 9/30181 712/208 |
| 6,415,377 | B1 | 7/2002 | Van Der Wolf et al. | |
| 6,453,407 | B1 | 9/2002 | Lavi et al. | |
| 6,477,683 | B1 * | 11/2002 | Killian | G06F 17/5045 716/104 |
| 7,079,147 | B2 | 7/2006 | Wichman et al. | |
| 7,664,928 | B1 * | 2/2010 | Andrews | G06F 9/30043 712/14 |
| 7,873,814 | B1 | 1/2011 | Cohen et al. | |
| 8,473,724 | B1 * | 6/2013 | Kenville | G06F 9/30076 712/229 |
| 2003/0079089 | A1 | 4/2003 | Barrick et al. | |
| 2003/0171907 | A1 * | 9/2003 | Gal-On | G06F 8/447 703/14 |
| 2003/0208723 | A1 | 11/2003 | Killian et al. | |
| 2003/0225998 | A1 * | 12/2003 | Khan | G06F 9/3001 712/210 |
| 2004/0268007 | A1 | 12/2004 | Nguyen et al. | |
| 2005/0081014 | A1 | 4/2005 | Tran et al. | |
| 2006/0101369 | A1 * | 5/2006 | Wang | G06F 9/30145 716/104 |
| 2007/0050603 | A1 * | 3/2007 | Vorbach | G06F 9/30181 712/221 |
| 2007/0101105 | A1 | 5/2007 | Diefendorff | |
| 2007/0283358 | A1 * | 12/2007 | Kasahara | G06F 9/5044 718/104 |
| 2009/0167351 | A1 | 7/2009 | Agarwal et al. | |
| 2010/0153654 | A1 * | 6/2010 | Vorbach | G06F 12/0862 711/137 |
| 2010/0205404 | A1 | 8/2010 | Henry et al. | |
| 2012/0131309 | A1 * | 5/2012 | Johnson | G06F 9/30 712/41 |
| 2012/0260042 | A1 | 10/2012 | Henry et al. | |
| 2013/0254485 | A1 | 9/2013 | Kannan et al. | |
| 2014/0181415 | A1 | 6/2014 | Loh et al. | |
| 2015/0106596 | A1 * | 4/2015 | Vorbach | G06F 9/3001 712/221 |
| 2016/0246599 | A1 * | 8/2016 | Johnson | G06F 9/3016 |
| 2017/0161037 | A1 | 6/2017 | Henry et al. | |
| 2017/0161067 | A1 | 6/2017 | Henry et al. | |
| 2017/0161195 | A1 | 6/2017 | Henry et al. | |
| 2017/0161196 | A1 | 6/2017 | Henry et al. | |

OTHER PUBLICATIONS

Nurudeen Abiodun Lameed, Dynamic Compiler Optimization Techniques for MatLab, 2013, [Retrieved on Sep. 24, 2018]. Retrieved from the internet: <URL: http://digitool.library.mcgill.ca/webclient/StreamGate?folder_id=0&dvs=1537818279662~590> 202 Pages (1-222) (Year: 2013).*

Barat, Francisco. et al. "Reconfigurable Instruction Set Processors; a Survey." IEEE International Workshop on Rapid System Prototyping. Jun. 21, 2000. pp. 168-173.

Bertels, Koen et al. "The MOLEN Polymorphic Processor." IEEE Transactions on Computers. vol. 53, No. 11, Nov. 2004. pp. 1363-1375.

Barat, Francisco et al. "Reconfigurable Instruction Set Processors from a Hardware/Software Perspective." *IEEE Transations on Software Engineering*. vol. 27, No. 9, Sep. 2002. pp. 847-862.

Grad, Mariusz et al. "Just-in-Time Instruction Set Extension—Feasibility and Limitations for an FPGA-Based Reconfigurable ASIP Architecture." Paralel and Distributed Processing Workshops and PHD Forum (IPDPSE). 2011 IEEE International Symposium on IEEE. May 16, 2011. pp. 278-285.

* cited by examiner

COMPILER SYSTEM FOR A PROCESSOR WITH AN EXPANDABLE INSTRUCTION SET ARCHITECTURE FOR DYNAMICALLY CONFIGURING EXECUTION RESOURCES

CROSS REFERENCE TO RELATED APPLICATION(S)

This application is a continuation of the following U.S. patent application which is hereby incorporated by reference in its entirety for all intents and purposes.

| SER. NO. | FILING DATE | TITLE |
|---|---|---|
| 15/337,140 | Oct. 28, 2016 | PROCESSOR WITH AN EXPANDABLE INSTRUCTION SET ARCHITECTURE FOR DYNAMICALLY CONFIGURING EXECUTION RESOURCES |

Application Ser. No. 15/337,140 claims priority to U.S. Provisional Patent Application No. 62/264,816, filed Dec. 8, 2015, which is hereby incorporated by reference in its entirety for all purposes.

BACKGROUND OF THE INVENTION

Field of the Invention

The present invention relates in general to processors, and more particularly, to a processor with an expandable instruction set architecture that enables dynamic configuration of execution resources.

Description of the Related Art

Processors continue to become more powerful. The term "processor" as used herein refers to any type of processing unit, including a microprocessor, a central processing unit (CPU), a processing core, a microcontroller, etc. The term "processor" as used herein also includes any type of processor configuration, such as processing units integrated on a chip or integrated circuit (IC) including those incorporated within a system of a chip (SOC) or the like. Semiconductor manufacturing techniques are continually being improved to increase speed, reduce power consumption and reduce the size of circuitry integrated on a processing chip. The reduction of integration size allows additional functionality to be incorporated within the processing unit. Once a processor is manufactured, however, its execution processing functions and its instruction set architecture (ISA) are essentially fixed. A programmer or a compiler cannot deviate beyond the well defined bounds of the standard instructions defined for a given processor configuration without risking improper operation or even failure.

Many applications are written to include a series of instructions designed to perform a particular function or processing operation that is not specifically performed by any hardware block within a processing unit. Often, such code includes a software loop that may be executed a substantial number of times during execution of the application program. Although a processor may be fabricated to include a hardware block to perform a specific function to accelerate execution and completion to improve performance of that specific application, such a solution is not practical since the same hardware block might not be useful for any other programs. General purpose processors, therefore, are typically manufactured to include relatively common and basic functions to that are generally useful and practical for a large variety of different software applications. The programmer must construct algorithms, functions and operations to meet the needs of the specific application using the standard instruction set provided.

SUMMARY OF THE INVENTION

A compiler system according to one embodiment converts an application source program into an executable program according to a predetermined instruction set architecture (ISA) that is executable by a general purpose processor implemented according to the predetermined ISA, in which the processor includes a programmable execution unit (PEU) that is programmable to execute a specified user-defined instruction (UDI) received by the processor for execution. The compiler system includes a PEU programming tool and a compiler. The PEU programming tool converts a functional description of a processing operation to be performed by the PEU of the processor into programming information for programming the PEU to perform the processing operation in response to the specified UDI. The compiler converts the application source program into the executable program, in which the compiler includes at least one optimization routine that represents a portion of the application source program with the specified UDI and that inserts the UDI into the executable program, and that further inserts into the executable program a UDI load instruction that specifies the UDI and a location of the programming information in the executable program.

The compiler may consults the PEU programming tool to incorporate the UDI and corresponding programming information into the executable program. The compiler may use the at least one optimization routine to generate the functional description of a processing operation. The executable program may includes a standard program that only includes instructions from the predetermined ISA and that does not include the specified UDI, and may further include a custom program that includes the specified UDI and the programming information.

The compiler may incorporate the programming information as UDI information into the application source program to provide a modified application source program, and may then compile the modified application source program into the executable program. The PEU programming tool may generate an output including UDI definitions and corresponding programming information. The compiler may incorporate the output of the PEU programming tool as UDI information into the application source program to provide a modified application source program, and may then compile the modified application source program into the executable program. The output of the PEU programming tool may be a header file.

The compiler may link to the programming information during compilation of the application source program into the executable program. The PEU programming tool may generate an output including UDI definitions and corresponding programming information, and the compiler may links to the output of the PEU programming tool during compilation of the application source program into the executable program. The output of the PEU programming tool may be a header file.

A method according to one embodiment of compiling an application source program into an executable program according to a predetermined instruction set architecture (ISA) that is executable by a general purpose processor implemented according to the predetermined ISA, in which the processor includes a programmable execution unit (PEU) that is programmable to execute a specified user-defined instruction (UDI) received by the processor for execution, includes converting a functional description of a processing operation to be performed by the PEU of the processor into programming information for programming the PEU to perform the processing operation in response to the specified UDI, and compiling the application source program into the executable program, including representing a portion of the application source program with the specified UDI, inserting the UDI into the executable program, and further inserting into the executable program a UDI load instruction that specifies the UDI and a location of the programming information in the executable program.

BRIEF DESCRIPTION OF THE DRAWINGS

The benefits, features, and advantages of the present invention will become better understood with regard to the following description, and accompanying drawings where.

DETAILED DESCRIPTION

The inventors have recognized the inefficiencies associated with processors with fixed execution resources and corresponding limited instructions sets. They have therefore developed a system and method of dynamically configuring the execution resources coupled with an expandable ISA to improve processor operating efficiency. Instead of having to write code using the standard limited instruction set, a software programmer has the option of writing a hardware functional description to perform a specific processing operation. The hardware functional description is converted to programming information by a programming tool or the like, in which the programming information is incorporated into the executable code. During execution, the programming information is used to program a programmable execution unit (PEU) within the processor to perform the same processing operation. The PEU is a hardware accelerator that can perform the processing operation faster and more efficiently than the code it replaces. The software programmer may further specify a user-defined instruction (UDI), or the UDI may otherwise be provided by the programming tool, which replaces the code to invoke the PEU to perform the programmed processing operation. In this manner, rather than writing a routine or process in software using a limited instruction set, the UDI calls the PEU to perform the processing operation wherever and whenever needed.

In addition, even after the source code is written using the standard ISA of the processor, a compiler may be provided that incorporates or otherwise links to the programming tool to automatically generate one or more UDIs and corresponding PEU programming information. The compiler includes optimization routines that examine the code to identify where improvements may be made, such as where the code is spending most of its time. The compiler generates custom executable code that incorporates the UDI(s) and programming information to program the PEU on the fly during execution to improve operation. Furthermore, the programming tool may be used with a code analysis tool or the like that is able to convert existing executable code into custom executable code incorporating one or more UDIs and corresponding PEU programming information.

In summary, the PEU is a programmable execution unit that serves as a hardware accelerator that may be programmed to enable the processor to perform newly created processing operations even after the processor is manufactured. One or more user-defined instructions replace the legacy code that would otherwise be required to perform the same processing operation. A programmer, compiler or even a code analysis tool may be used after the fact to define and create new instructions that invoke the PEU to optimize existing processing operations during execution.

Figure 1:
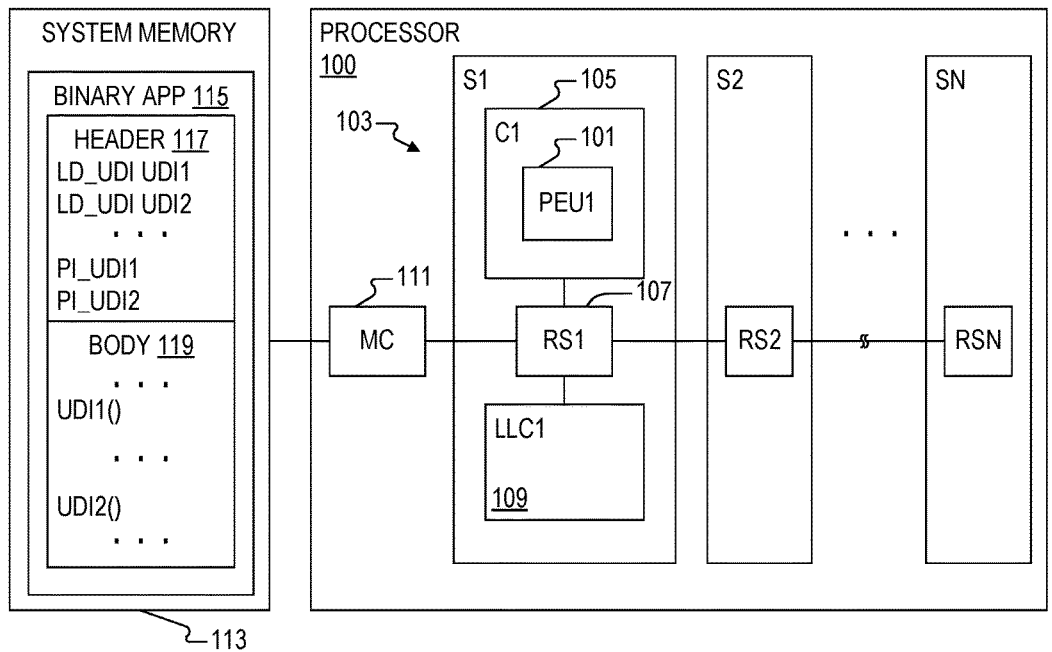
FIG. 1 is a simplified block diagram of a processor incorporating a first programmable execution unit implemented according to one embodiment of the present invention.

FIG. 1 is a simplified block diagram of a processor 100 incorporating a first programmable execution unit (PEU1) 101 implemented according to one embodiment of the present invention. The standard instruction set architecture (ISA) of the processor 100 may be an x86 macroarchitecture in which it can correctly execute a majority of the application programs that are designed to be executed on an x86 processor. An application program is correctly executed if its expected results are obtained. In particular, the processor 100 executes instructions of the x86 instruction set and includes the x86 user-visible register set. The present invention is not limited to x86 architectures, however, in which the processor 100 may be according to any alternative ISA as known by those of ordinary skill in the art.

The processor 100 includes N core slices 103, individually labeled S1, S2, . . . , SN, in which N is any positive integer including 1 (i.e., the processor 100 includes at least one core slice and may include only one processing core). The details of the first core slice S1 are shown and described further, where it is understood that each of the remaining core slices S2-SN may be implemented in substantially similar manner. The first core slice S1 includes a first processing core C1 105, which further incorporates the PEU 101, shown as a first programmable execution unit PEU1. Each processing core of the remaining core slices S1-SN may include a similar PEU. The processing core 105 is coupled to a ring stop RS1 107, which is further coupled to a "last level cache" (LLC) 109, labeled LLC1. Each of the remaining core slices S2-SN includes a similar ring stop, individually labeled as ring stops RS2-RSN, which are each further coupled between a corresponding processing core and LLC of corresponding core slices.

In the illustrated configuration, the ring stops RS1-RSN are each coupled together in a ring configuration which is further coupled to a memory controller (MC) 111 incorporated on the processor 100. The MC 111 is further coupled to an external system memory 113. In an alternative embodiment, the MC 111 may be provided external to the processor 100 in which the processor 100 includes a bus interface unit or the like (not shown) for interfacing an external memory controller and the system memory 113. The core slices S1-SN share the resources of the system memory 113, and may also share information with each other via the ring stops RS1-RSN. It is appreciated that the processor 100 may be configured as a single core processor incorporating a single PEU rather than multiple core slices, each configured with a separate PEU.

The system memory 113 stores an executable binary application (APP) 115, which further includes a header 117 and a main body 119. The binary APP 115 is shown in generic form and may be implemented as a binary executable (.EXE) file, a bytecode file (.NET, Java, etc.), or any other type of executable code that may be successfully executed by any one or more of the processing cores of the processor 100 including the processing core C1. In the illustrated configuration, the header 117 includes at least one load command, in which each load command is provided for specifying and loading a corresponding user-defined instruction (UDI) into the processor 100 for execution by the PEU1 101. As shown, for example, the header 117 includes a first load command LD_UDI UDI1 for specifying and loading a first user-defined instruction UDI1, and the header 117 includes a second load command LD_UDI UDI2 for specifying and loading a second user-defined instruction UDI2. As further described herein, UDI1 and UDI2 may be opcodes that are configured or otherwise selected from among a set of available UDI opcodes. Although the binary APP 115 includes two user-defined instructions, an executable binary application may include any number of user-defined instructions that may be concurrently supported by the programmable execution unit of the processing core, such as the PEU1 101 of the core C1.

The load commands each include an address or the like to corresponding programming information for programming the programmable execution unit of the processing core. The header 117 includes and the load command LD_UDI UDI1 points to first programming information PI_UDI1. Also, the header 117 includes and the load command LD_UDI UDI2 points to second programming information PI_UDI2. The programming information may be included within the header 117 as shown, or may be provided within a separate section of the binary APP 115. As further described herein the processing core C1 accesses and loads PI_UDI1 and PI_UDI2 into the PEU1 101. After being programmed, during operation of the body 119 of the binary APP 115, the PEU1 101 performs a first programmed function or processing operation in response to an instruction UDI1( ) and performs a second programmed function or processing operation in response to an instruction UDI2( ). The parenthesis "( )" denote that each user-defined instruction UDI1 and UDI2 may include any number (zero or more) of operands for performing the respective function. Each operand may have the same form as the operands of standard instructions, such as real numbers, constants, integers, Boolean, etc., that may be provided by the UDI itself or otherwise loaded into registers or the like.

Although not shown, the system memory 113 may include multiple application programs that are loaded for execution by the processor 100 over time. Multiple applications may be loaded into any one or more of the processing cores C1-CN, although each processing core typically executes only one process at a time in the illustrated embodiment. Embodiments in which each processing core executes multiple processes at a time are contemplated. Multiple application programs may be assigned for execution by one of the processing cores. An operating system (OS) includes a scheduler or the like that schedules execution of the application programs of the processor 100 including swapping in and out each multiple processes for execution, one at a time, for a given processing core. Multiple applications may be executed by a given processing core, such as C1, in which each application may include one or more UDIs programmed into the PEU1 101. Although the PEU1 101 may have sufficient resources to handle one or more UDIs for each of multiple applications, the PEU1 101 is a limited resource in which UDI programming may be swapped out during operation as further described herein.

Figure 2:
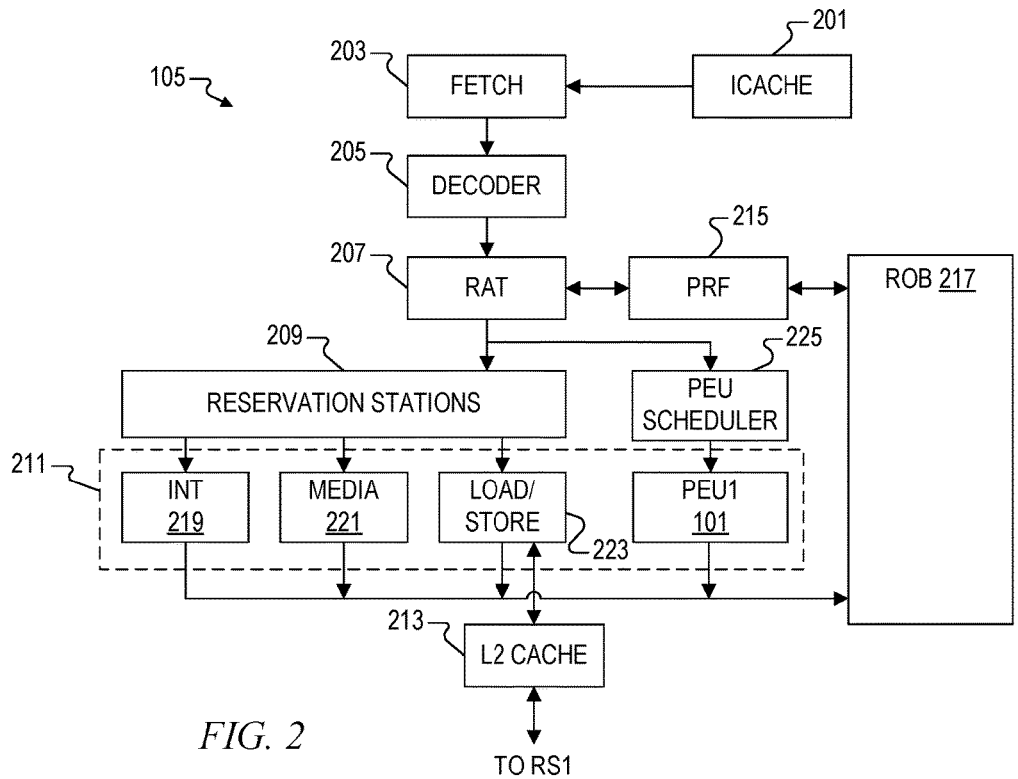
FIG. 2 is a simplified block diagram of the processing core of FIG. 1 implemented according to one embodiment of the present invention.

FIG. 2 is a simplified block diagram of the processing core C1 105 according to one embodiment of the present invention. In the illustrated embodiment, the processing core C1 105 includes an instruction cache (ICACHE) 201, a front end pipe including an instruction fetch (FETCH) engine 203, a decoder 205, and a register alias table (RAT) 207, and further includes reservation stations 209, execution units 211, a level-2 (L2) cache 213, a physical register file (PRF) 215 and a reorder buffer (ROB) 217. The L2 cache 213 further interfaces the ring stop RS1 for ultimately accessing the system memory 113. The execution units 211 may include one or more integer (INT) units 219, one or more floating point or media units 221, one or more load and store pipelines (load/store pipes) 223, and the PEU1 101. The load/store pipes 223 may be configured as separate load and store pipelines and/or load and store combination pipes. The load/store pipes 223 may incorporate a memory order buffer (MOB) (not shown) or the like and may further include a level-1 (L1) cache (not shown) interfacing the L2 cache 213. The reservation stations 209 may include any combination of schedulers for dispatching instructions to the individual execution units 211. For example, separate integer, media and load/store schedulers may be included for dispatching instructions to the INT units 219, the media units 221 and the load/store pipes 223, respectively. The processing core C1 105 further includes a PEU scheduler 225 that receives issued UDIs from the RAT 207 and that dispatches the UDIs to the PEU1 101 as further described herein.

The instruction cache 201 caches program instructions from an active application located in the system memory 113, such as the binary APP 115. The fetch engine 203 fetches program instructions from the instruction cache 201 and forwards them to the decoder 205, which decodes them into instructions for execution by one or more of the execution units 211. In one embodiment, instruction translation is a process that translates macroinstructions (or macro-ops) of a macroinstruction set of the processor 100 (such as the x86 instruction set architecture) into microinstructions (or micro-ops) of a microinstruction set architecture of the processing core C1 105. As used herein, the macroinstructions and microinstructions may generally be referred to herein generally as "instructions" and more specifically as macro-ops and micro-ops, respectively. For example, a memory access instruction may be decoded into a sequence of microinstructions that includes one or more load or store microinstructions. The binary APP 115 is populated with macro-ops, which are converted by the decoder 205 into corresponding micro-ops that are part of the native instruction set of the processor 100. The RAT 207 generates dependency information for each instruction based on its program order, on the operand sources it specifies, and on renaming information.

The RAT 207 dispatches the decoded micro-ops and their associated dependency information to the RS 209 or to the PEU scheduler 225. In general, standard instructions of the ISA of the processor 100 are dispatched to the reservation stations 209, whereas UDIs are dispatched to the PEU scheduler 225. The RS 209 and the PEU scheduler 225 each include at least one queue that holds the instructions and dependency information received from the RAT 207. The reservation stations 209 dispatch received instructions to corresponding ones of the execution units 211 when they are ready to be executed, and the PEU scheduler 225 dispatches received UDI micro-ops to the PEU1 101 when ready for execution. An instruction is considered ready for execution when all of its dependencies are resolved. In conjunction with dispatching an instruction, the RAT 207 allocates an entry in the ROB 217 for the instruction. Thus, the instructions are allocated in program order into the ROB 217, which may be configured as a circular queue to ensure that the instructions are retired in program order. The RAT 207 also provides the dependency information to the ROB 217 for storage in the instruction's entry therein. The RAT 207 further allocates or maps one or more physical registers within the PRF 215 for each instruction for storage of operands and results.

The results of the execution units 211 may be fed back to the ROB 217 to update corresponding registers within the PRF 215. In one embodiment, the RAT 207 maps architectural registers to physical registers in the PRF 215 and updates pointers or the like (not shown) in the ROB 217 corresponding to the instructions. The pointers in the ROB 217 may be updated during or after execution, and the pointers are used to update contents of registers within the PRF 215 during operation. The ROB 217 ultimately retires instructions in program order to ensure proper operation in accordance with the instructions of the binary APP 115.

The processor 100 is superscalar and includes multiple execution units and is capable of issuing multiple instructions to the execution units 211 (including the PEU1 101) in a single clock cycle. The processor 100 is also configured to perform out-of-order execution. That is, the reservation stations 207 may issue instructions out of the order specified by the program that includes the instructions. Superscalar out-of-order execution processors typically attempt to maintain a relatively large pool of outstanding instructions so that they can take advantage of a larger amount of instruction parallelism. The processor 100 may also perform speculative execution of instructions in which it executes instructions, or at least performs some of the actions prescribed by the instruction, before it is know for certain whether the instruction will actually complete. An instruction may not complete for a variety of reasons, such as a mis-predicted branch instruction, exceptions (interrupts, page faults, divide by zero conditions, general protection errors, etc.), and so forth. Although the processor 100 may perform some of the actions prescribed by the instruction speculatively, the processor does not update the architectural state of the system with the results of an instruction until it is known for certain that the instruction will complete. This may be determined, for example, when the instruction is retired by the ROB 217.

Figure 3:
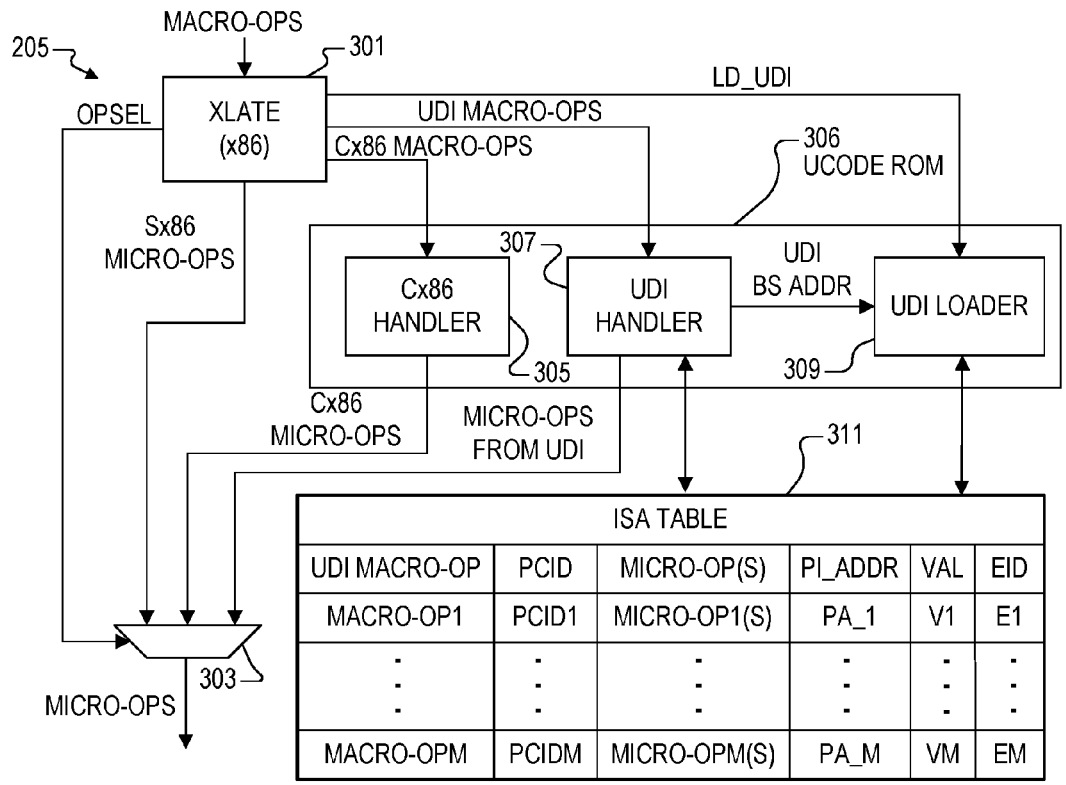
FIG. 3 is a simplified block diagram of the decoder of FIG. 2 implemented according to one embodiment of the present invention.

FIG. 3 is a simplified block diagram of the decoder 205 implemented according to one embodiment of the present invention. The instructions from the fetch engine 203 are referred to as x86 macroinstructions or macro-ops which are provided to a translator (XLATE) 301, which converts each macro-op into one or more micro-ops for execution by a corresponding one of the execution units 211. The x86 instruction set architecture (ISA) includes known macro-ops including more common or simple x86 instructions denoted "Sx86" and more complicated x86 instructions denoted "Cx86." The translator 301 incorporates conversion logic (not shown) for converting Sx86 macro-ops into corresponding Sx86 micro-ops provided to one input of a multiplexor (MUX) 303. The more complex Cx86 macro-ops are "trapped" to a Cx86 handler 305 within a microcode (UCODE) ROM 306. The Cx86 handler 305 includes the appropriate code or routines for converting each Cx86 macro-op into one or more Cx86 micro-ops provided to another input of the MUX. It is noted that conversion and processing of the standard x86 instructions, including the Sx86 and Cx86 instructions, are known and not further described herein.

The x86 ISA further includes a set of user-defined instructions, or UDIs, which are not defined within the standard instruction set of the x86 ISA. In general, the standard instruction set of the x86 ISA consumes a subset of the full set of opcodes, in which remaining opcodes were previously considered "undefined." In prior configurations, when the translator 301 encounters any of these undefined instructions, they were also trapped to an undefined instruction handler (not shown) of the UCODE ROM 306 for taking an appropriate action, such as asserting an error or the like (e.g., general protection fault). For purposes of the present case, however, a portion of these undefined opcodes are reserved as UDI macro-ops for definition by the user for performing user-defined functions or processing operations. The UDI macro-ops are forwarded by the translator 301 to a UDI handler 307 within the UCODE ROM 306, which forwards one or more corresponding UDI micro-ops to the MUX 303. It is noted that in some configurations, conversion from a UDI macro-op to the corresponding UDI micro-ops may be performed outside of the UCODE ROM 306. The UCODE ROM 306 further includes a UDI loader 309 responsive to LD_UDI commands for programming the PEU1 101 for a corresponding UDI as further described herein. The translator 301 asserts a control signal OPSEL to a control input of the MUX 303 for selecting from among the Sx86, Cx86 or UCI micro-ops provided to the RAT 207 depending upon the macro-op received.

The decoder 205 further includes an ISA table 311 that is used by the UDI handler 307 to convert the UDI macro-ops to the corresponding UDI micro-ops. In one embodiment, the ISA table 311 is stored in a programmable RAM (PRAM) provided within the processor 100. Each row of the ISA table 311 includes a UDI macro-op field that includes a macro-op opcode for a UDI defined by the user, a corresponding process context identifier (PCID) field that includes a PCID value identifying the process for which the UDI is defined, a micro-op field that lists one or more micro-ops to be sent to the RAT 207 via the MUX 303, a programming information address (PI_ADDR) field that points to a location in memory (e.g., the system memory 113) to locate the programming information for the UDI, a valid field identifying whether the UDI is valid or not, and an execution identifier (EID) that is used to locate that portion of the PEU1 101 that is programmed to perform the function or processing operation identified by the corresponding UDI. As shown, the ISA table 311 includes up to "M" entries in which M is a positive integer number.

In one embodiment, each UDI macro-op maps to one corresponding UDI micro-op that is provided to the RAT 207 to be issued to the PEU scheduler 225 for dispatch and execution by the PEU1 101. The micro-ops in the ISA table 311 includes the corresponding UDI micro-op to which it is mapped. The micro-ops in the ISA table 311 may further include additional non-UDI or standard micro-ops to facilitate the UDI processing operation. For example, one or more micro-ops may be included before the UDI micro-op to load or move one or more operand values from one storage location (memory location or register) to another before execution of the UDI, and one or more micro-ops may be included after the UDI micro-op to move one or more result values from one storage location to another after execution of the UDI.

Figure 15:
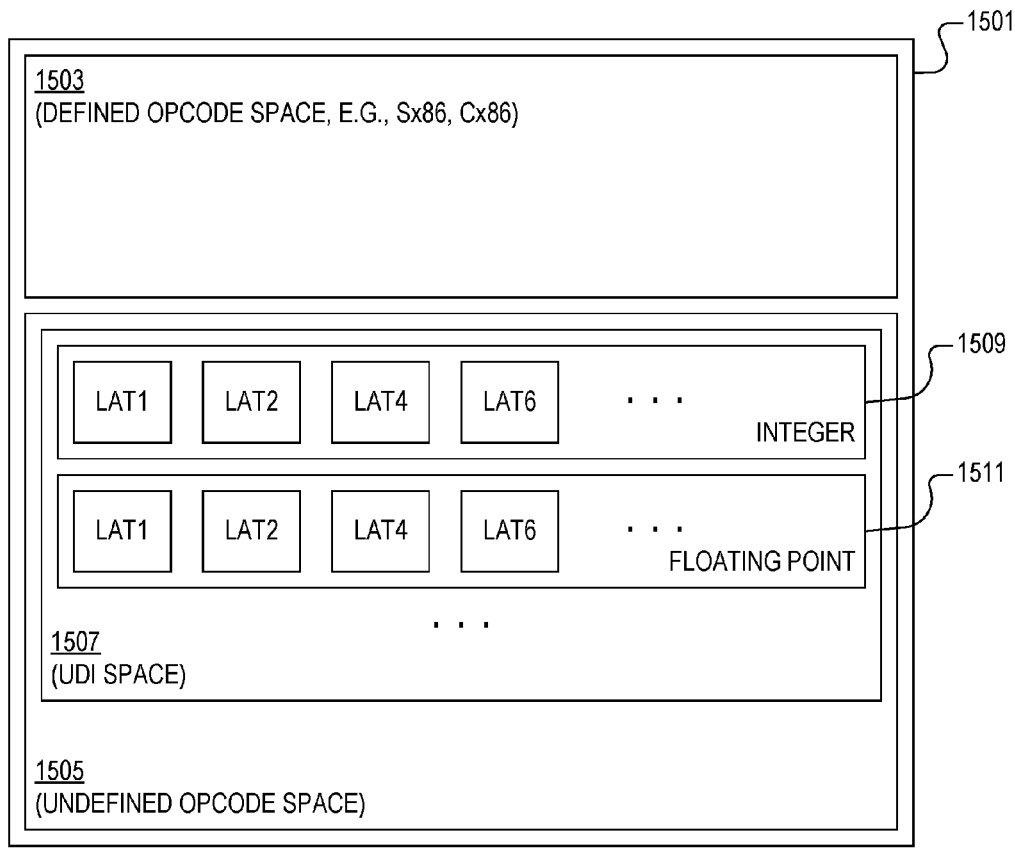
FIG. 15 is a simplified block diagram generally illustrating the opcode space of the processor of FIG. 1 according to one embodiment of the present invention.

FIG. 15 is a simplified block diagram generally illustrating the opcode space of the processor 100 according to one embodiment of the present invention. A universal opcode space 1501 defines the entire OPCODE space of the processor 100, which is generally determined by the number of bits of the allowed opcodes of the macro-op instructions. As a simple example, if the instruction opcodes are defined to include up to 16 bits, then the universal block 1501 represents all possible opcode combinations, or $2^{16}=64,536$ possible opcodes. A defined opcode space 1503 incorporated within the universal block 1501 represents all of the defined macroinstructions, such as the more common or simple x86 instructions denoted "Sx86" and more complicated x86 instructions denoted "Cx86" and possibly any reserved opcodes. An undefined opcode space 1505 incorporated within the universal block 1501 represents all of the remaining opcode space of the universal block 1501 not included with the defined opcode space 1503, which includes all of the currently undefined opcode space.

A processor with an expandable ISA as described herein carves out a portion of the previously undefined opcode space 1505 as user-defined instruction (UDI) space 1507. This opcode space is set aside to allow a program generator to define UDIs to enable a PEU, such as the PEU1 101, to perform user-defined instructions defined and programmed by the user. The UDI space 1507 may further be sub-divided by instruction type. As an example, a UDI may be one of integer type instructions provided within integer UDI instructions 1509, or may be one of floating point type instructions provided within floating point UDI instructions 1511, etc. Additional UDI instruction types may be defined. Each of the UDI instruction types are further sub-divided by instruction latency. Latency (LAT) refers to the amount of time that the instruction needs to complete in terms of clock cycles. For example, simpler UDI instructions may be completed in 1 or 2 clock cycles, LAT1 or LAT2, respectively, or may need a larger number of clock cycles, such as 4 or 6 clock cycles or more, such as LAT4 or LAT6, respectively, or more.

The UDI micro-op that is mapped to the corresponding UDI macro-op in the ISA table 311 incorporates at least one latency field that identifies the corresponding latency of the UDI macro-op selected by the user (or selected by the programming function). Referring back to FIG. 2, the PEU scheduler 225 of the core C1 105 is configured to determine the latency of the received micro-op from the latency field of the received UDI micro-op. The PEU scheduler 225 uses the latency information for scheduling timing for each of the UDI micro-ops received.

Figure 4:
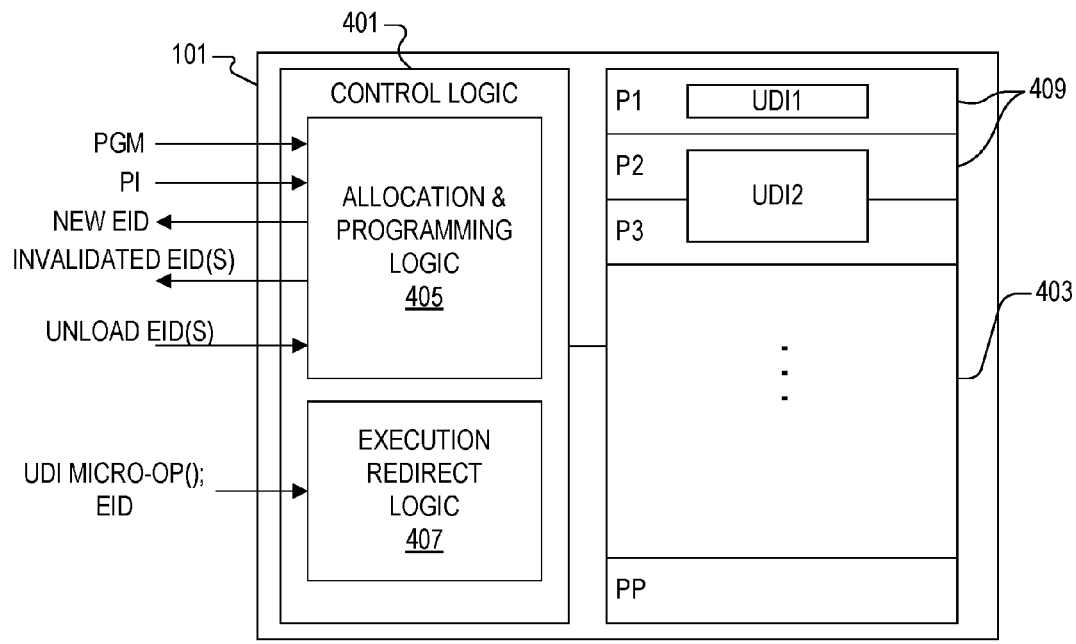
FIG. 4 is a simplified block diagram of the programmable execution unit (PEU) of FIG. 1 according to one embodiment of the present invention.

FIG. 4 is a simplified block diagram of the PEU1 101 according to one embodiment of the present invention. The PEU1 101 includes control logic 401 and programmable logic 403. The control logic 401 includes allocation & programming logic 405 and execution redirect logic 407. In the illustrated embodiment, the programmable logic 403 is subdivided into a set of "P" substantially identical programmable sections 409, individually shown as programmable sections P1, P2, . . . , PP, in which "P" is a positive integer. The UDI loader 309 interfaces the allocation & programming logic 405 to program a processing operation into the programmable logic 403. In particular, the UDI loader 309 provides or otherwise asserts a programming value input (PGM) indicating a programming session, and provides the programming information (PI) to an input of the allocation & programming logic 405. The allocation & programming logic 405 allocates one or more of the sections 409 sufficient to program and perform the processing operation, and then receives corresponding programming information accessed by the UDI loader 309 to program the allocated sections 409. The allocation & programming logic 405 provides an execution ID (EID) that maps to those sections 409 that have been programmed for the particular processing operation.

The PEU1 101 may be a relatively large resource, such as implemented by a field programmable gate array (FPGA) or the like, to program multiple user-defined instructions at a time for each of multiple application processes. Nonetheless, the PEU1 101 is a limited resource in that remaining un-allocated sections 409 may be insufficient to program a new processing operation to be programmed. In such event, the allocation & programming logic 405 may invalidate previously allocated sections 409 while programming a new processing operation, thereby invalidating one or more previously programmed processing operations. When one or more previously programmed processing operations are invalidated, the allocation & programming logic 405 outputs any EIDs that have been invalidated. When a process has completed operation such that it is terminated, any instructions that have been programmed for that process are unloaded. The UDI loader 309 is further configured to provide one or more EIDs of processing operations that are associated with a given process that has been terminated, in which case the allocation & programming logic 405 de-allocates the corresponding sections 409 to make them available to be programmed for new processing operations. The UDI loader 309 may also unload any given processing operation by providing the corresponding EID of the processing operation to be unloaded.

Each section 409 may include sufficient programmable logic to perform a simple processing operation. For example, a user-defined instruction UDI1 may be associated with a simple processing operation that may be performed by a single section 409. As shown, the section P1 is programmed to perform the processing operation associated with UDI1. A more complicated processing operation, such as associated with a user-defined instruction UDI2, may require more than one section 409 to perform the corresponding processing operation. As shown, for example, sections P2 and P3 are programmed to perform the processing operation associated with UDI2. In addition, even more complicated processing operations may be implemented with more than two of the sections 409.

In one embodiment, the allocation & programming logic 405 performs dynamic allocation in which it identifies the next section 409 available for allocation and begins programming as it receives the programming information PI configured to program the indicated processing operation. If the programming information PI continues after a first allocated section 409 has been completely programmed such that additional sections 409 are needed to complete the programming, additional sections are dynamically allocated on the fly until the processing operation is completely programmed into the PEU1 101. In an alternative embodiment, the programming information PI may be configured to include a resource statement or the like (1103, FIG. 11) that indicates the number of sections 409 that are needed for the processing operation. In this case, the allocation & programming logic 405 pre-allocates the indicated number of sections and then programs the allocated sections using the programming information PI.

After being programmed, and in response to a UDI encountered during process execution, the execution redirect logic 407 receives a UDI micro-op and a corresponding EID to perform the corresponding processing operation. The execution redirect logic 407 uses the received EID to redirect and apply the UDI micro-op to the corresponding one or more sections 409 that are programmed to perform the corresponding processing operation. As shown, for example, an EID for the user-defined instruction UDI1 directs the execution redirect logic 407 to apply UDI2 to the sections P2 and P3 that are programmed to perform the corresponding processing operation for the user-defined instruction UDI2.

Figure 5:
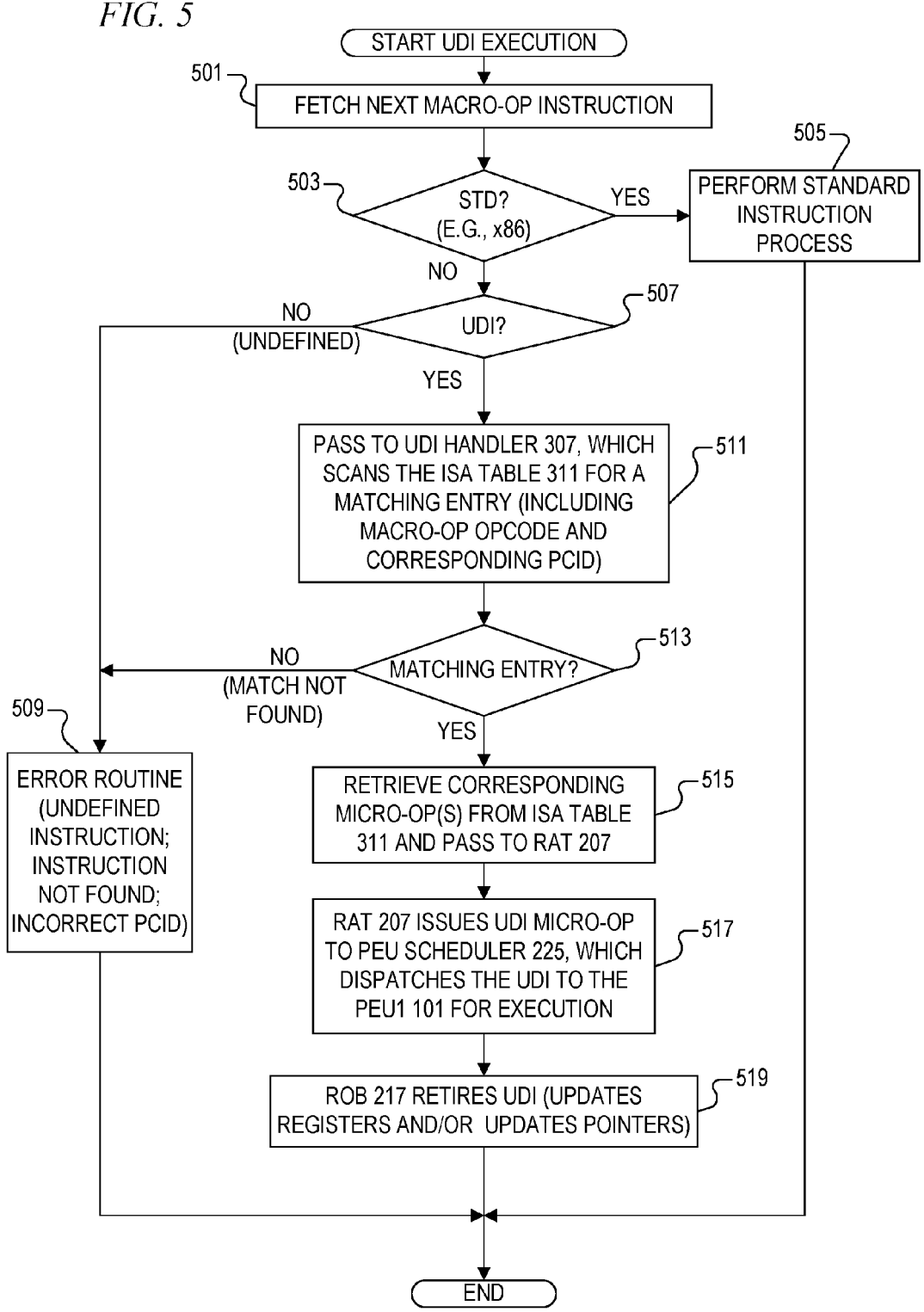
FIG. 5 is a flowchart diagram illustrating operation of the processing core of FIG. 1 for processing user-defined instructions (UDIs) incorporated within an application according to one embodiment of the present invention.

FIG. 5 is a flowchart diagram illustrating operation of the processing core C1 105 for processing UDIs incorporated within an application, such as the binary APP 115, according to one embodiment of the present invention. At a first block 501, the next macro-op instruction is fetched from the instruction cache 201 and forwarded to the decoder 205. If the decoder 205 determines that the instruction is a standard x86 instruction, such as any of the defined Sx86 or Cx86 instructions, then operation proceeds to a block 505 to perform a standard instruction process and operation is completed. The standard instruction process is known and is not further described.

If the instruction is not a standard x86 instruction, operation proceeds instead to inquiry block 507 in which it is queried whether the instruction is a UDI. If not, operation proceeds to an error routine block 509 that performs any desired function in response to an undefined instruction. The implementing logic passes a variable or the like to the error routine block 509 that indicates that an undefined instruction has been received. For example, the processing core C1 105 may issue a general protection fault or the like. After the error routine of block 509 is performed, operation is completed for that instruction. If the instruction is a UDI, then operation proceeds to block 511 in which the macro-op is passed to the UDI handler 307, which scans the ISA table 311 for a matching entry for the received macro-op, including a matching opcode and corresponding matching PCID. If a matching entry is not found, then operation is passed to the error routine block 509 with an indication indicating the mismatch, and appropriate action is taken. For example, if a matching opcode is not found the indication may indicate a non-defined or unknown UDI has been received. If a matching opcode has been found but for a different PCID, then the indication may so indicate. As previously described, each UDI is defined for a particular process identified by its PCID. If the PCID in the ISA table 311 does not match the PCID of the currently executing process, then operation proceeds to the error routine block 509 with the indication that an unauthorized process is attempting to execute a UDI defined for another process.

If a match is found within the ISA table 311 as determined at block 513, then operation proceeds to block 515 in which the corresponding one or more micro-ops are retrieved from the ISA table 311 and passed to the RAT 207. During operation as shown at block 517, the RAT 207 issues a corresponding UDI micro-op to the PEU scheduler 225, which eventually dispatches the UDI to the PEU1 101 for execution of the corresponding programmed processing operation. After UDI execution, operation proceeds to block 519 in which the ROB 217 eventually retires the UDI including any updates to pointers within the ROB 217 and registers within the PRF 215. Operation is then completed for the UDI.

Figure 6:
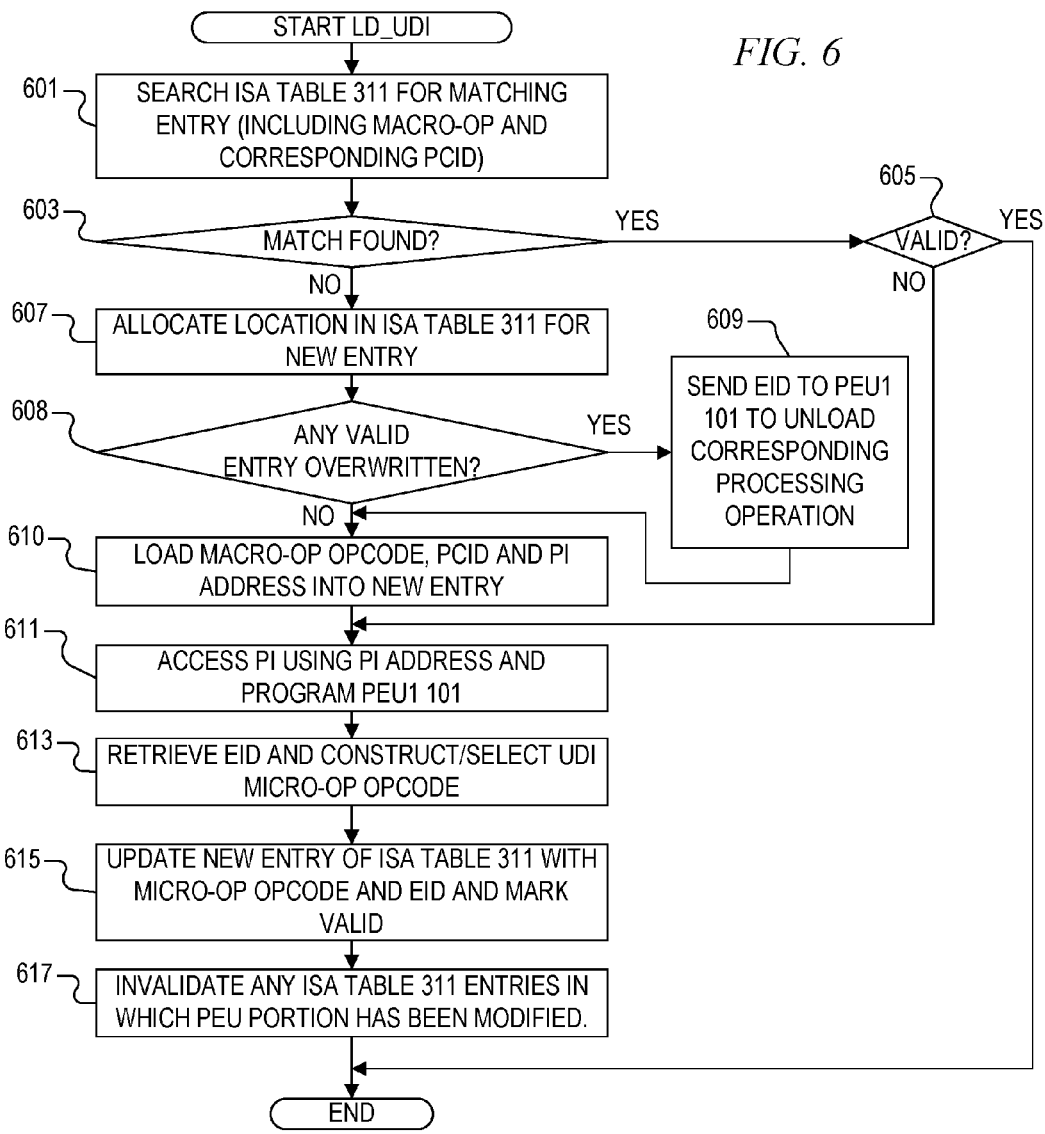
FIG. 6 is a flowchart diagram illustrating operation of the UDI loader of FIG. 3 for negotiating with the programmable execution unit to program the processing core for performing a processing operation associated with a UDI in response to a UDI load command according to one embodiment of the present invention.

FIG. 6 is a flowchart diagram illustrating operation of the UDI loader 309 for negotiating with the PEU1 101 to program the processing core C1 105 for performing a processing operation associated with a UDI in response to a UDI load command LD_UDI according to one embodiment of the present invention. At first block 601, the UDI loader 309 searches the ISA table 311 for a matching entry for the macro-op and corresponding PCID. If a matching entry is found as determined at next inquiry block 603 for both the macro-op and the PCID, then the UDI has been previously defined for that process with the same PCID. The OS previously loaded the process including the UDI, and then the OS may have temporarily suspended the process to allow another process to be executed in the interim. When the process is reloaded, the UDI loader 309 performs this re-load process to determine whether the UDI is still valid. When a match is found, then operation proceeds to block 605 to determine whether the entry is still valid. As previously described, intervening process may include one or more UDIs in which the programming of a processing operation for the current process has been overwritten within the PEU1 101. If the matching entry is valid, then operation is completed for the current UDI. The operation is repeated for each UDI that was previously defined for the current process.

If a match is not found in the ISA table 311, then operation proceeds to block 607 in which the UDI loader 309 allocates a location in the ISA table 311 for a new entry. It is noted that when allocating a location in the ISA table 311 at block 607, the UDI loader 309 simply accesses the next available empty location. If there are no more available empty locations, then a previously invalidated entry may be accessed to be overwritten. The number M of entries may be relatively large to reduce the likelihood that all M entries are used by the currently active processes at any given time. Nonetheless, it is certainly possible that any one or more currently active processes consume a significant number of entries so that there are no more available empty or invalidated locations. In that case, a currently valid entry of a temporarily suspended process is overwritten in order to allocate the new entry for the current process. When the temporarily suspended process subsequently becomes the current process and the loading function is performed again, then a matching entry is not found and a new entry is allocated in the same manner.

Operation then proceeds to block 608 in which it is inquired whether any valid entry in the ISA table 311 has been overwritten. If so, it is possible that the corresponding processing operation is still programmed within the PEU1 101 and still valid. It is also possible to keep the processing operation programmed in the PEU1 101 intact to avoid having to reprogram the PEU1 101 once again in the event that the process corresponding to the overwritten entry in the ISA table 311 subsequently becomes active once again. Nonetheless, in the illustrated embodiment, it is desired to maintain correspondence between the ISA table 311 and the PEU1 101 and to avoid further complicating the allocation & programming logic 405 to track programmed resources of overwritten entries. Thus, if a valid entry in the ISA table 311 has been overwritten as determined at block 608, operation proceeds to block 609 in which the processing operation corresponding to the overwritten entry is unloaded. Prior to actually overwriting the entry, the EID is of the entry being overwritten is retrieved and applied by the UDI loader 309 to the PEU1 101, in which the allocation & programming logic 405 unloads the corresponding processing operation and frees up space within the programmable logic 403 for subsequent programming.

If a valid entry has not been overwritten as determined at block 608, or after the processing operation in the PEU1 101 has been unloaded at block 609, operation proceeds to block 610 in which the macro-op opcode, the current PCID and the address of the programming information is loaded into the new entry of the ISA table 311. Operation then proceeds to block 611 in which the PI address is used to access the programming information, which is used by the UDI loader 309 to program the PEU1 101. Once programmed, the UDI loader 309 retrieves the EID from the PEU1 101 and constructs or otherwise selects the appropriate micro-op opcode for the new entry at next block 613. Operation then proceeds to block 615, in which the new entry of the ISA table 311 is updated with the corresponding micro-op and EID and the entry is marked as valid.

Operation then proceeds to block 617 to invalidate any entries within the ISA table 311 that have been modified and thus invalidated by the PEU1 101. As previously described, for example, allocation within the PEU1 101 may cause one or more of the sections 409 programmed for a processing operation for another UDI of another process to be overwritten thereby invalidating that UDI. In this case, rather than actually deleting the entry in the ISA table 311, it is simply invalidated since the process may be activated again.

If a match was found at block 603 but found to be invalidated at block 605, then operation proceeds to block 611 to access the corresponding programming information using the PI address of the matching entry, and the PEU1 101 is programmed. Operation then proceeds through blocks 613, 615 and 617 to ensure proper correlation between the ISA table 311 and the PEU1 101. In this case, even though the PEU1 101 was previously programmed for the UDI, one or more of its sections 409 has been overwritten so that the UDI has been invalidated. Even though the entry is marked as invalid, since macro-op opcode and corresponding PCID are still in the ISA table 311, the entry may instead be considered "inactive" since it has not been removed. The PI address of the entry is still valid. After the process is re-loaded by the OS, the PEU1 101 is re-programmed and the matching entry in the ISA table 311 is updated. After block 617, operation is completed.

Figure 7:
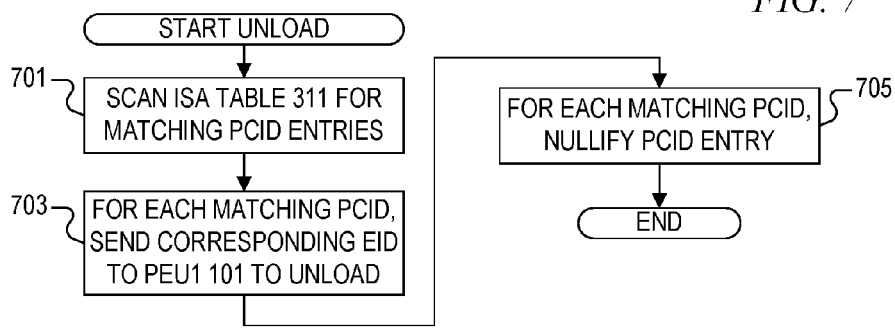
FIG. 7 is a flowchart diagram illustrating operation of the UDI loader of FIG. 3 to unload each UDI programmed for a particular process that has been terminated by the operating system according to one embodiment of the present invention.

FIG. 7 is a flowchart diagram illustrating operation of the UDI loader 309 to unload each UDI programmed for a particular process that has been terminated by the OS according to one embodiment of the present invention. At first block 701, the UDI loader 309 scans the ISA table 311 for entries having a matching PCID. At next block 703, for each matching PCID found, the corresponding EID is sent to the PEU1 101 to unload the corresponding programmed sections 409 for the UDI. In this manner, the de-allocated sections 409 may be used by other processes. At next block 705, for each matching PCID found, the PCID entry is nullified, and operation is completed. Nullifying the PCID allows the entry in the ISA table 311 to be re-allocated for a UDI of another process.

Figure 8:
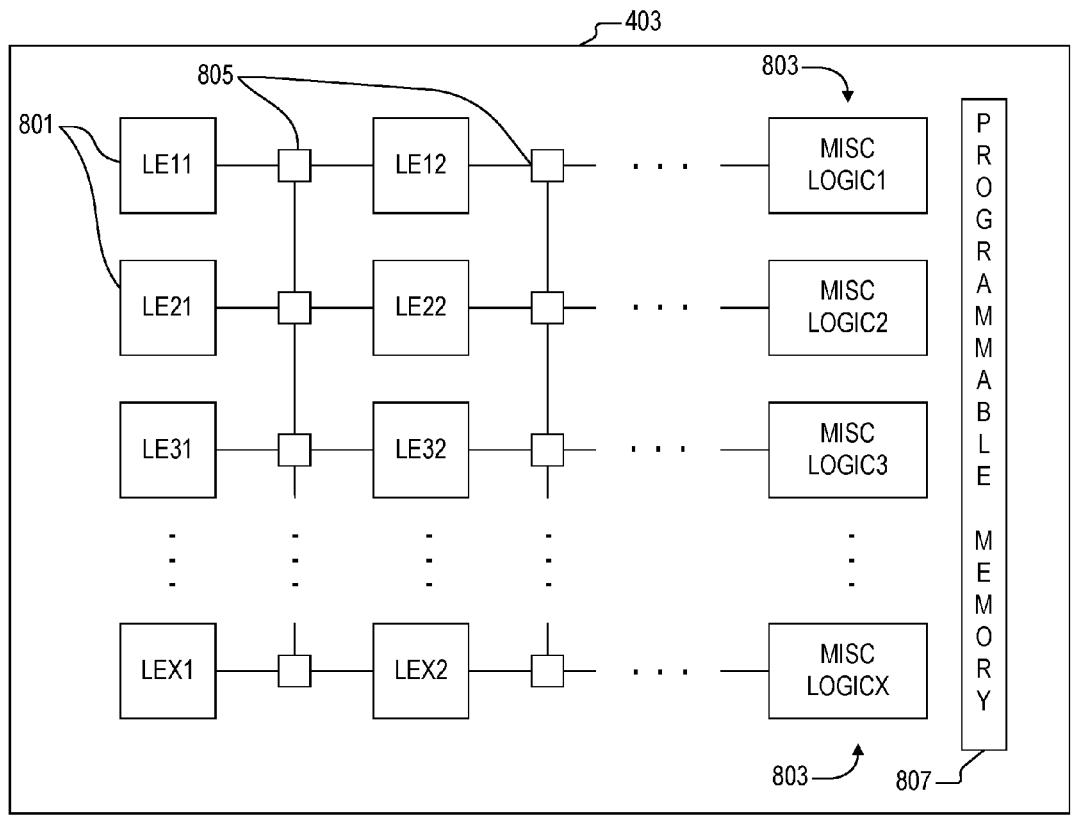
FIG. 8 is a more detailed block diagram of the programmable logic of FIG. 4 within the PEU according to one embodiment of the present invention.

FIG. 8 is a more detailed block diagram of the programmable logic 403 according to one embodiment of the present invention. The illustrated programmable logic 403 includes an array of programmable elements including programmable logic elements (LE) 801 shown arranged in an XY matrix of logic elements 801, individually shown as LExy in which x and y denote row and column indices, respectively, of the array. Each row further includes at least one of an array of miscellaneous logic blocks 803 each including supporting logic to supplement the matrix of logic elements 801. Each miscellaneous logic block 803 may include, for example, one or more storage elements, one or more registers, one or more latches, one or more multiplexers, one or more adders (to add or subtract digital values), a set of Boolean logic elements or gates (e.g., logic gates such as OR gates, AND gates, inverters, exclusive-OR (XOR) gates, etc.), etc. One or more registers may be configured as shift registers or data swizzlers or the like for flexible data manipulation. The logic elements 801 and the miscellaneous logic blocks 803 are coupled together with a routing mesh that includes a matrix of programmable crossbar switches or interconnectors 805. Each programmable interconnector 805 includes multiple switches to selectively connect the programmable devices together. The routing mesh includes sufficient connectivity to connect multiple ones of the logic elements 801 and miscellaneous logic blocks 803 together to perform simple processing operations and more complicated processing operations.

As further described herein, each section 409 includes one or more programmable elements, and corresponding routing mesh for selectively connecting the devices and elements together to perform a corresponding function or processing operation. The routing mesh is a switching matrix that includes multiple switches and the like for redirecting inputs and outputs between the logic elements 801 and miscellaneous logic blocks 803.

The programmable logic 403 incorporates programmable memory 807 that is used to program selected ones of the logic elements 801, corresponding miscellaneous logic blocks 803, and the programmable interconnectors 805 in such a manner as to perform the desired processing operation. The programmable memory 807 may also include storage locations or registers or the like to receive input operands or values and to store output results of a processing operation. The programmable memory 807 is distributed among the programmable sections 409 of the programmable logic 403, and may be used by each of the programmable sections 409 individually or collectively among selected allocated sections 409 performing a specific processing operation. The programmable memory 807 may be configured as private memory space within the programmable logic 403 or even within the processing core C1 105 and not externally accessible. Additional micro-ops may be issued for a UDI micro-op to store operands or to transfer results to available architectural registers. The memory 807 may be implemented in any suitable manner such as static random access memory (SRAM) or the like.

Figure 9:
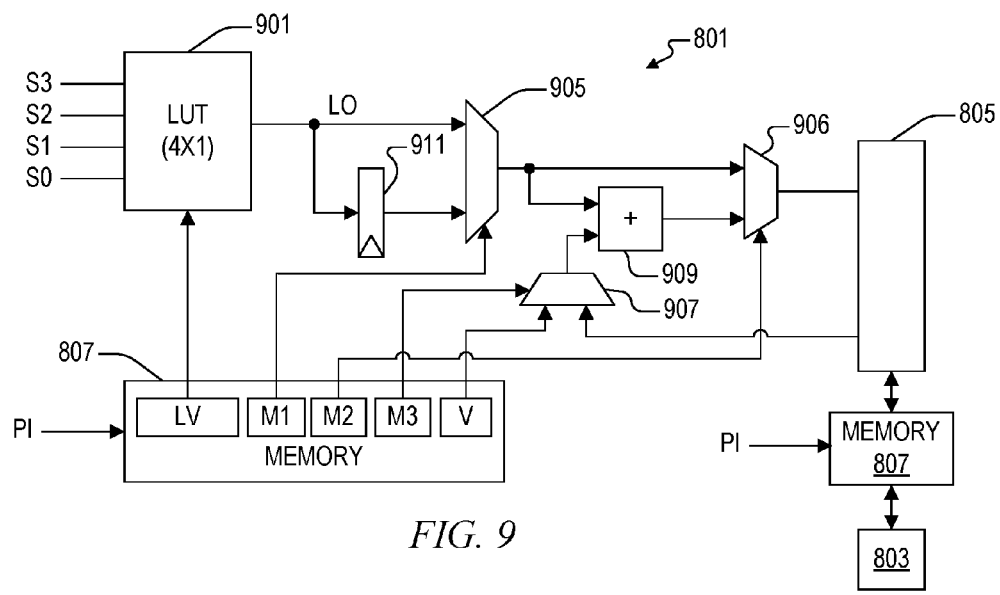
FIG. 9 is a schematic and block diagram of a programmable logic element of FIG. 8 implemented according to one embodiment of the present invention.

FIG. 9 is a schematic and block diagram of a programmable logic element 801 implemented according to one embodiment of the present invention. The logic element 801 includes a look-up table (LUT) 901, three 2-input multiplexers (MUXes) 905, 906 and 907, a 2-input adder 909, and a clocked register (or latch) 911. A portion of the programmable memory 807 is shown that is used to program portions of the logic element 801, any included miscellaneous logic blocks 803, and one or more interconnectors 805. As noted above, the programmable memory 807 may be used to provide input values, to store output results, and/or to store intermediate values that are updated for each of multiple iterations of a processing operation.

As shown, the memory 807 is programmed using the programming information PI. The LUT 901 is illustrated as a 4X1 LUT that is programmed with corresponding LUT value (LV) bits in the memory 807. Each of the MUXes 905, 906 and 907 has a select input controlled by a corresponding memory bit stored in the memory 807, shown as memory bits M1, M2, and M3, respectively. The output of the LUT 901, shown as LO, is provided to one input of the MUX 905 and to an input of the register 911, having its output provided to the other input of the MUX 905. The output of the MUX 905 is provided to one input of the MUX 906 and to one input of the adder 909. The output of the adder 909 is provided to the other input of the MUX 906, having its output provided to an input of the programmable interconnectors 805. The memory 807 includes a programmable bit V that is provided to one input of the MUX 907, having its other input coupled to an output of the programmable interconnectors 805, and having its output provided to the other input of the adder 909. The output of the adder 909 is provided to the other input of the MUX 906. The memory 807 may also be used to program corresponding portions of the interconnectors 805 and any miscellaneous logic blocks 803.

The illustrated logic element 801 is exemplary only and alternative versions are contemplated depending upon the particular configuration. The logic element 801 may be configured on a bit-slice granularity level for handling a single bit of a data value. For data values including multiple bits, multiple bit-slice logic elements are used. For example, for 64-bit data values, 64 bit-slice logic elements are used in parallel.

In operation, the memory 807 is programmed with the LUT data values (LV) of the LUT 901, the select inputs M1-M3 of the MUXes 905-907, and a programmable data value V provided to an input of the MUX 907. Four input values S0-S3 are provided from an operand of the instruction, from the memory 807, or from another programmed block to select one of 16 values programmed into the LUT 901, in which the selected value is provided at its output as LO. The MUX 905 is programmed to directly provide the LO output of the LUT 901 or to provide a registered version thereof. A registered version may be used to insert latency for purposes of timing of the programmed operation. The MUX 906 is programmed to directly provide the output of the MUX 905 or to provide an output of the adder 909 to the interconnector 805 to be provided as an output or to be provided to another programmed block. The adder 909 adds a selected value to the output of the MUX 905, in which the selected value is the programmed value V or is from an output of the interconnector 805 (provided from another input or from another programmed block).

Figures 10, 11:
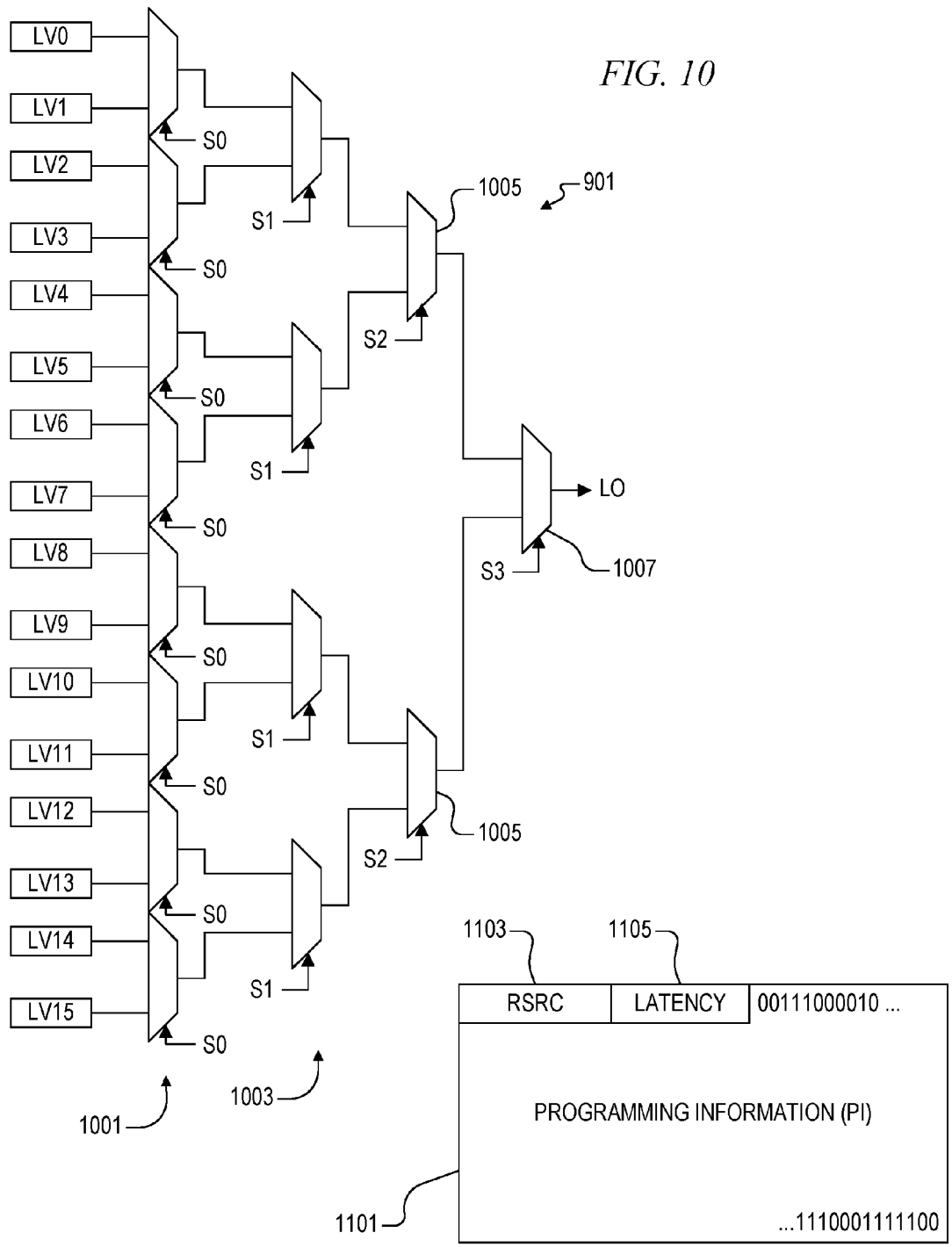
FIG. 10 is a schematic diagram of the look-up table (LUT) of FIG. 9 implemented according to one embodiment of the present invention.
FIG. 11 is a simplified block diagram of a format of the programming information for programming the PEU according to one embodiment of the present invention.

FIG. 10 is a schematic diagram of the LUT 901 implemented according to one embodiment of the present invention. A set of 2-input MUXes organized as a binary MUX tree is provided for choosing between 16 input values LV0-LV15 based on the select input S3:S0 (in which S0 is the least significant bit). The LV0-LV15 are programmed into the memory 807 as previously described. Each consecutive pair of the 16 input values LV0-LV15 (LV0 & LV1, LV2 & LV3, etc.) are provided to corresponding pairs of inputs of eight 2-input MUXes 1001 each receiving S0 at its select input. Each consecutive pair of the eight outputs of the MUXes 1001 are provided to the corresponding pairs of inputs of four 2-input MUXes 1003 each receiving S1 at its select input. Each consecutive pair of the four outputs of the MUXes 1003 are provided to the corresponding pairs of inputs of two 2-input MUXes 1005 each receiving S2 at its select input. The pair of outputs of the MUXes 1005 are provided to the pair of inputs of an output MUX 1007 receiving S3 at its select input and providing the LUT output LO at its output. It is appreciated that the configuration shown in FIG. 10 is only one of many suitable LUT implementations as understood by those of ordinary skill in the art.

FIG. 11 is a simplified block diagram of a format of the programming information PI according to one embodiment of the present invention, shown as PI 1101. In this case, the PI 1101 may include a resource statement (RSRC) 1103 that indicates the amount of resources needed within the programmable logic 403 for implementing the programmed processing operation. As an example, the resource statement 1103 may indicate the number of programmable sections P needed to complete the programming. The allocation & programming logic 405 may read the resource statement 1103 during programming of the PEU1 101 to allocate a corresponding number of the programmable sections 409. Although a greater degree of granularity may be used, such may require additional logic of the allocation & programming logic 405 to track the programmed portions of the programmable logic 403. The PI 1101 may also include a latency statement 1105 indicating the latency of the programmed processing operation, such as the number of clock cycles to complete. In one embodiment, the UDI loader 309 may read the latency statement 1105 for constructing or otherwise selecting the appropriate micro-op opcode that indicates the same latency when issued to the PEU scheduler 225. As previously described, the PEU scheduler 225 uses the latency information indicated by the UDI micro-op for determining the latency of the corresponding processing operation.

The PI 1101 may further include a series of logic ones (1s) and zero's (0s) otherwise referred to as a bit stream. In one embodiment, for example, in response to assertion of the PGM input, the allocation & programming logic 405 aligns the programmable memory (including the programmable memory 807 and corresponding programmable memory of the interconnectors 805) of allocated ones of the programmable sections 409 into a large serialized shift register, and then shifts in the bit stream until fully loaded within each of the allocated sections. Alternative programming methods and formats may be used including parallel programming. Also, the resource and latency statements may be provided at any suitable location, such as at the beginning or the end, to be read by the allocation & programming logic 405 to ensure proper programming.

Figure 12:
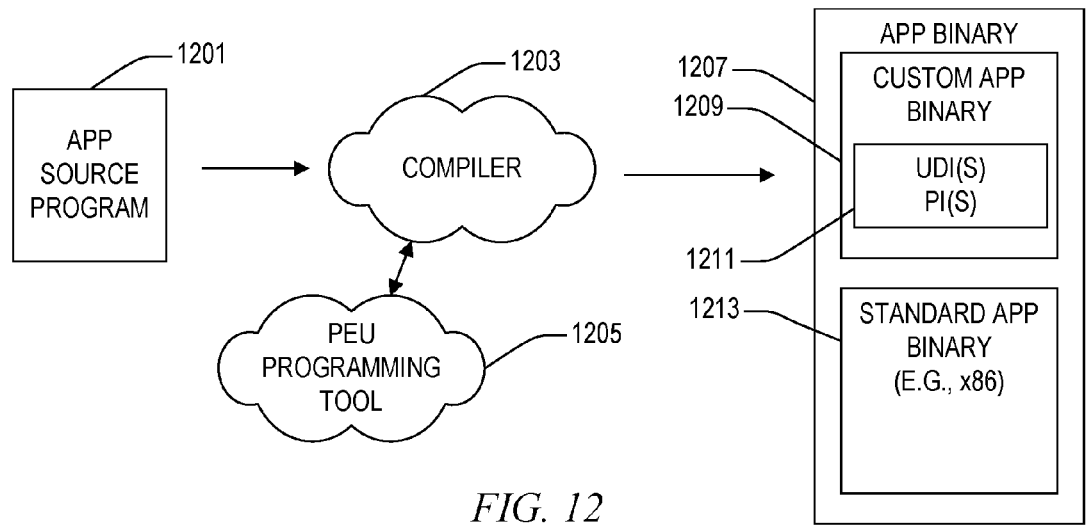
FIG. 12 is a simplified block diagram illustrating a first method of generating an application incorporating one or more UDIs and the corresponding programming information for programming a PEU according to one embodiment of the present invention.

FIG. 12 is a simplified block diagram illustrating a first method of generating an application incorporating one or more UDIs and the corresponding programming information for programming a PEU, such as the PEU1 101, according to one embodiment of the present invention. An application generator, such as a programmer or the like, writes an application source program 1201 in any suitable high level programming language, such as, for non-limiting examples, C, C++, BASIC, Cobol, Fortran, Pascal, Ada, JavaScript, etc. In this case the application generator need not be particularly aware of the capabilities of the processor 100 incorporating the PEU1 101. The application source program 1201 is provided to a compiler 1203 suitable for converting the selected high level programming language into a binary application file 1207 executable by the processor 100. A PEU programming tool 1205 is either incorporated within the compiler 1203 or is otherwise linked to the compiler 1203.

During the compile process, the compiler 1203 executes optimization routines and the like that examine the code of the application source program 1201 to determine whether code optimizations may be utilized. For example, the optimization routines determine any particular portions of the code that consume significant amounts of time during execution. The compiler 1203 determines whether one or more instructions in the application source program 1201 may be replaced by one or more UDIs for execution by the PEU of the target processor. If so, the compiler 1203 consults the PEU programming tool 1205 to incorporate one or more UDIs and corresponding programming information within the binary application file 1207. If one or more UDIs may be used to optimize and/or accelerate execution, then the compiler 1203 generates custom binary application code 1209 within the binary application file 1207, in which the custom binary application code 1209 incorporates one or more UDIs and corresponding programming information PI(s) as shown at 1211. The custom binary application code 1209 has a similar format as the binary APP 115 previously described.

The custom binary application code 1209 may be loaded into the system memory 113 and executed by the processor 100 in a similar manner previously described for the binary APP 115. The custom binary application code 1209 incorporates one or more suitable LD_UDI commands to load one or more UDIs and to program the PEU1 101 accordingly. In some configurations or implementations, the custom binary application code 1209 may not execute properly. For example, an incorrect or incompatible version of the PEU programming tool 1205 or the compiler 1203 or an incompatible version of the processor 100 may cause such incorrect operation. In the illustrated embodiment, the compiler 1203 also generates standard binary application code 1213 that is also incorporated within the binary application file 1207. In the event that the custom binary application code 1209 fails to load into the processor 100 correctly, the standard binary application code 1213 is loaded instead.

In one embodiment, the custom binary application code 1209 and the standard binary application code 1213 are both complete versions in which each may be executed separately or independently by a compatible processor. Alternatively, the standard binary application code 1213 may be configured to include patch code or the like to replace UDI code portions of the custom binary application code 1209 in the event that the custom binary application code 1209 fails to load. Thus, in this case the standard binary application code 1213 is not a complete version but instead supplements the custom binary application code 1209 to patch over incompatible UDI portions of the code.

Figure 13:
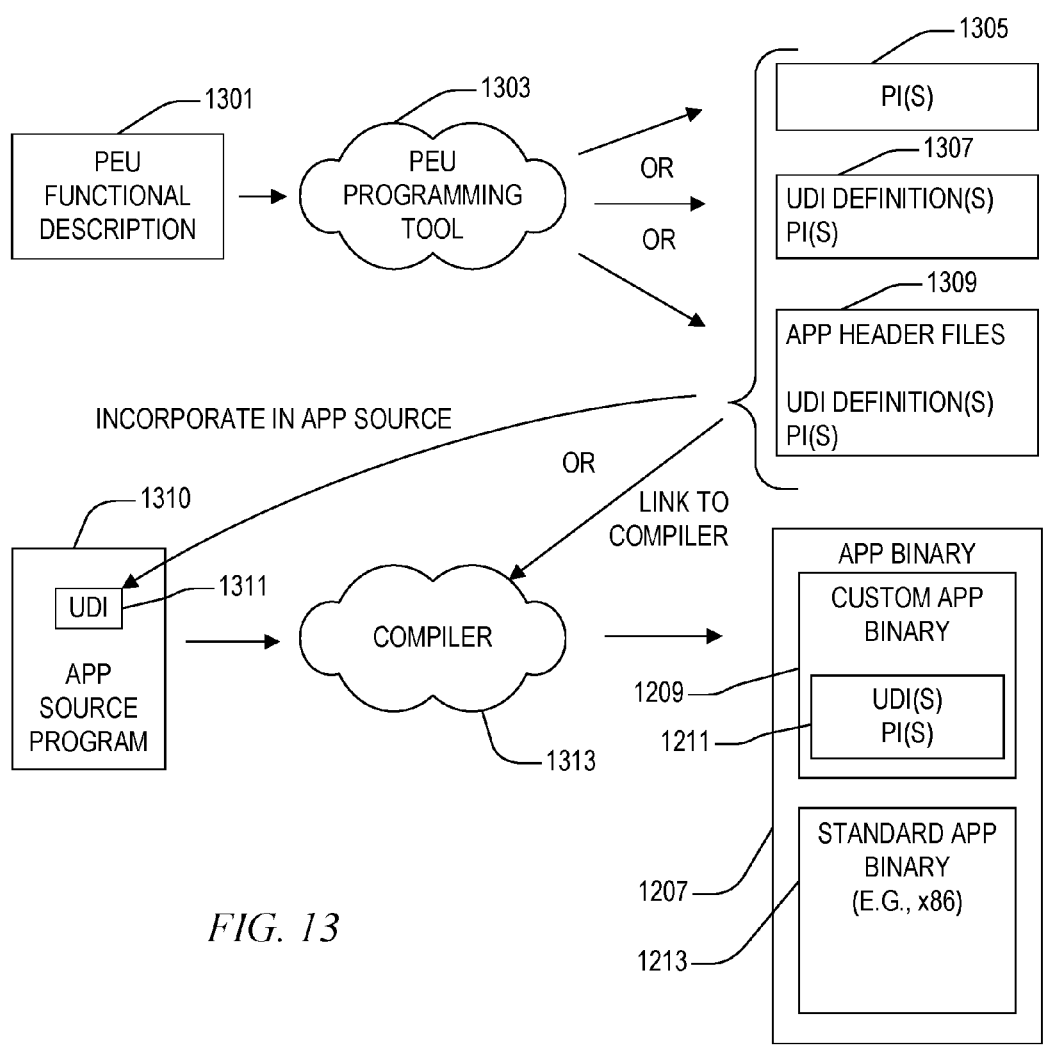
FIG. 13 is a simplified block diagram illustrating a second method of generating an application incorporating one or more UDIs and the corresponding programming information for programming a PEU according to one embodiment of the present invention.

FIG. 13 is a simplified block diagram illustrating a second method of generating an application incorporating one or more UDIs and the corresponding programming information for programming a PEU, such as the PEU1 101, according to one embodiment of the present invention. In this case, the application generator writes a PEU functional description 1301 in a selected format that describes the processing operation of the PEU in response to a corresponding UDI during execution. The PEU functional description 1301 may be written in any suitable hardware programming language, such as LegUp, Catapult (by Catapult technology), Verilog, HDL (Hardware Description Language), register control logic (RCL), register transfer logic (RTL), etc. The PEU functional description 1301 is provided to a corresponding PEU programming tool 1303 that is configured to convert the PEU functional description 1301 into the programming information suitable to program the PEU1 101.

The PEU programming tool 1303 may be configured to convert the PEU functional description 1301 into any one of several different types outputs depending upon the configuration. In one embodiment, the PEU programming tool 1303 outputs one or more blocks of programming information 1305 for a corresponding one or more UDIs configured by the programmer. In another embodiment, the PEU programming tool 1303 outputs a file including UDI definitions and corresponding programming information 1307. In yet another embodiment, the PEU programming tool 1303 outputs one or more application header files 1309 including the UDI definitions and corresponding programming information.

A suitable compiler 1313 incorporates the output of the PEU programming tool 1303 into an application source program 1310 to generate the binary application file 1207. As an example, the application generator incorporates the output of the PEU programming tool 1303 as UDI information 1311 into the application source program 1201, to provide the application source program 1310. In this case, the application source program 1201 is modified by or otherwise supplemented by the UDI information 1311 to create the application source program 1310. The UDI information 1311 may include UDI load commands, UDI definitions and corresponding programming information for implementing the one or more UDI processing operations. The modified or supplemented application source program 1201 is then provided to the compiler 1313, which generates the binary application file 1207 previously described.

In another case, the application generator links the output of the PEU programming tool 1303 to the compiler 1313 when compiling the original and unmodified application source program 1201, and the compiler 1313 supplements the information from the application source program 1201 with the output of the PEU programming tool 1303 to generate the binary application file 1207.

Figure 14:
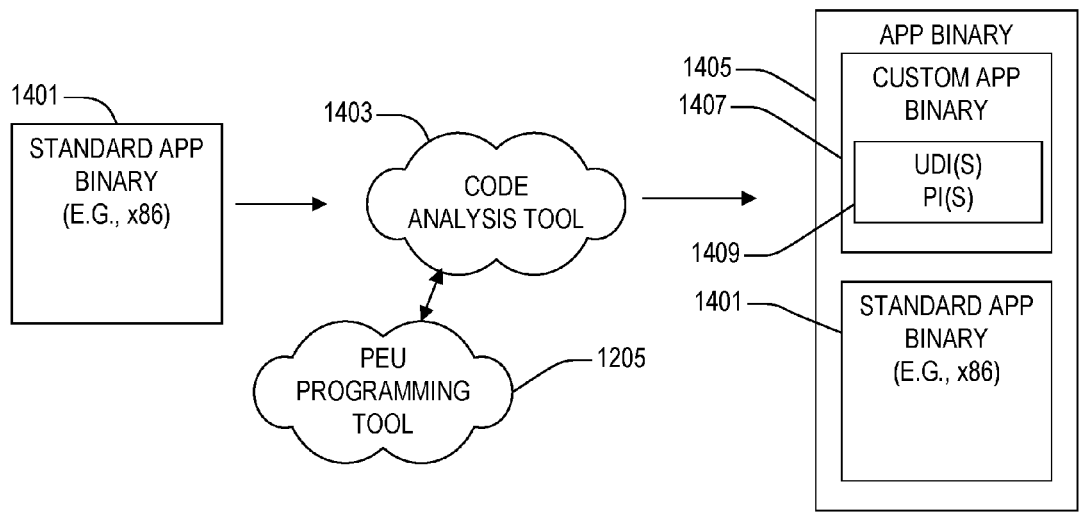
FIG. 14 is a simplified block diagram illustrating another method of generating an application incorporating one or more UDIs and the corresponding programming information for programming a PEU according to one embodiment of the present invention.

FIG. 14 is a simplified block diagram illustrating another method of generating an application incorporating one or more UDIs and the corresponding programming information for programming a PEU, such as the PEU1 101, according to one embodiment of the present invention. In this case, a compiled executable program, such as any standard binary application code 1401, is processed by a code analysis tool 1403 that executes optimization routines and the like to examine the binary code and to determine whether code optimizations may be utilized. For example, the optimization routines identify any particular portions of the code that consumes significant amounts of time during execution. The code analysis tool 1403 determines whether one or more instructions in the standard binary application code 1213 may be replaced by one or more UDIs for execution by the PEU of the target processor. If so, the code analysis tool 1403 consults the PEU programming tool 1205 to incorporate one or more UDIs and corresponding programming information within an output binary file 1405 (similar to the binary application file 1207). If one or more UDIs may be used to optimize and/or accelerate execution, then the code analysis tool 1403 generates corresponding custom binary application code 1407 within the binary application file 1405, in which the custom binary application code 1407 incorporates one or more UDIs and corresponding programming information as shown at 1409. The binary application file 1405 may also include the original binary application code 1401 in a similar manner as previously described for the binary application file 1207.

There are at least two functions of a software program that may be recognized by a programmer, or otherwise detected by a compiler or a code analyzer, in which hardware acceleration is particularly advantageous. A first software program function is a software loop. The code within a software loop may be executed multiple times (even as much as thousands or even millions of times) each time the loop is executed, which may itself be many times during the execution life of the program. Replacing a large portion or even all of the code in a software loop can save many clock cycles each time the loop is executed. In this context, saving clock cycles means reducing the number of clock cycles per loop execution. In this manner, saving even just a few cycles per loop execution may save a significant number of cycles during the execution life of the program.

A second software program function is a subroutine or procedure or the like that may be called often by the main code of the program. In many cases, a large portion or even all of the subroutine may be replaced by a single UDI thereby improving the efficiency of subroutine execution. The branching to and from the subroutine may result in significant performance degradation during execution. If the subroutine can be replaced by a single UDI, the inefficiencies associated with branching to and from the subroutine may be eliminated altogether. A compiler may simply insert the subroutine "inline" at any location in which the subroutine is called. The UDI may not only reduce the size of inline insertion, but may further perform the same function more efficiently.

In addition to doing an analysis of a static binary (e.g. x86) to perform the UDI construction and insertion such as shown in FIG. 14, a similar technique can be applied to runtime systems that execute in the context of a dynamic compiler or virtual machine. For example, rather than an x86 binary, the input could be a Java Bytecode program running in the Java Virtual Machine (JVM). Since the JVM already ingests the bytecode and dynamically creates x86 code to be executed, it necessarily already does most of the analysis needed to identify code segments that could be opportunistically replaced with a UDI. This analysis and optimization can be performed in situ as the application is dynamically compiled by the JVM, in much the same way that a binary analysis tool may optimize a static x86 binary. Another similar example is to augment a JavaScript engine (e.g. Google V8) to optimize a JavaScript process. Another example is to augment Pin or DynamoRIO or VMWare to optimize an x86 process while it is executing within that environment (instead of pre-execution, as would be the case with a static recompiler/optimizer).

Figure 16:
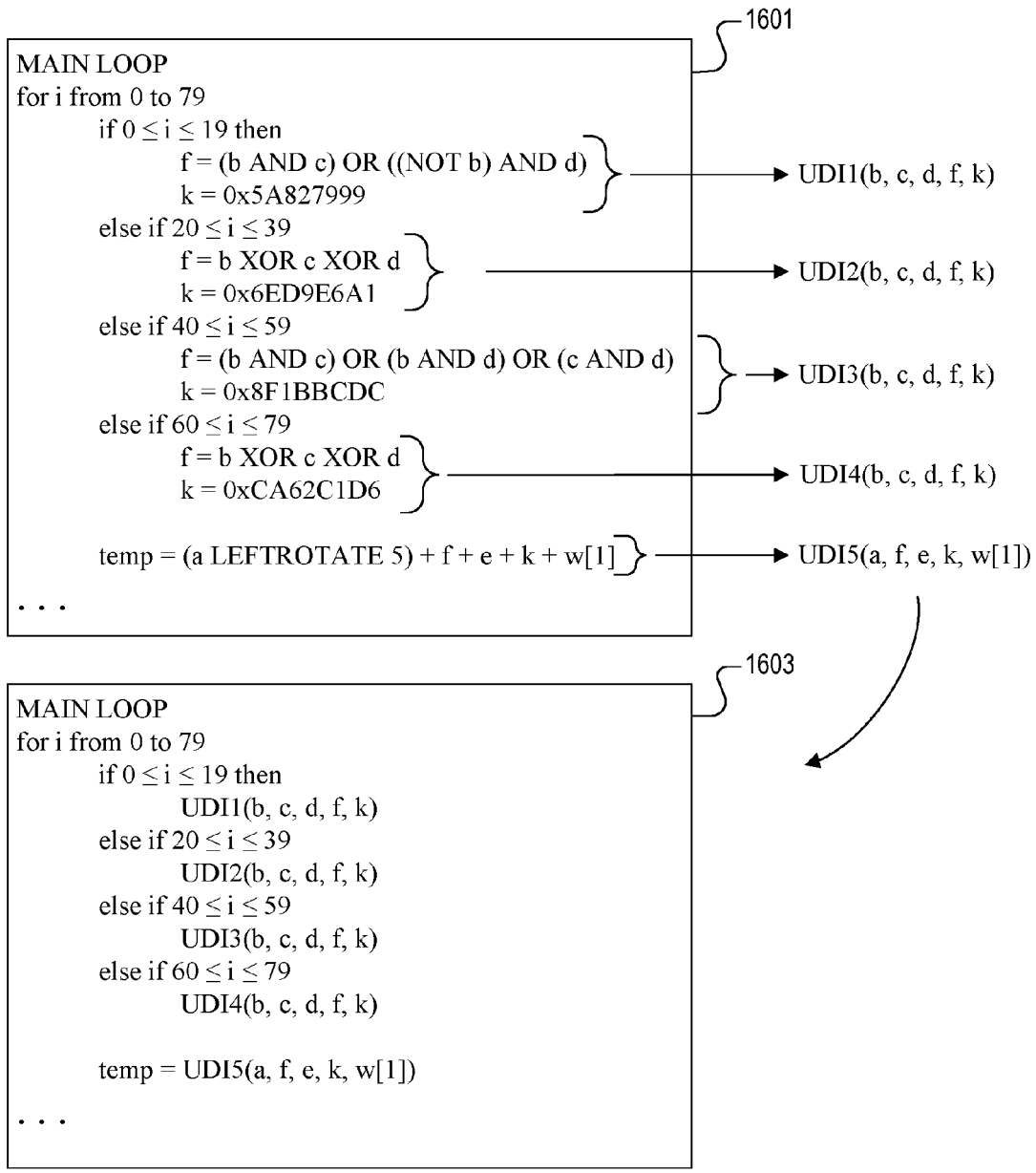
FIG. 16 is a simplified example of replacing standard code in a routine of an application program with UDIs according to one embodiment of the present invention to provide a replacement application program using the UDIs.

FIG. 16 is a simplified example of replacing standard code in a routine of an application program 1601 with UDIs according to one embodiment of the present invention to provide a replacement application program 1603 using the UDIs. The application program 1601 incorporates a "MAIN LOOP" that includes an if/then/else series of statements based on an index value "i" for implementing a secure hash algorithm 1 (SHA-1). In the loop, the index value "i" varies from 0 to 79, and depending upon the value of i, a set of input variables b, c and d are converted to output variables f and k. A following step in the loop sets a variable "temp" using values a, f, e, k and w[1] as input variables. The input and output variables a, b, c, d, e, f, k may be stored or provided in architectural registers.

According to the SHA-1 hashing function, depending upon the index i, the variable f is determined based on input values b, d and d, and the variable k is set to a different hexadecimal constant value (in which "0x" in front of constant value denotes hexadecimal) as shown. In each of four cases for index i ranging from 0 to 19, or 20 to 39, or 40 to 50, or 60 to 79, f is determined using a combination of Boolean functions AND, NOT, OR, and XOR using b, c and d as the input variable values. Once f and k are determined, the variable "temp" is determined using a rotation function of the variable a added to input values f, e, k and w[1] as shown. The rotation function shown is LEFTROTATE 5 in which the binary variable a stored in a register is rotated left 5 times to achieve the desired value.

The Boolean operations for each of the four if/then/else cases are relatively simple. In the first case for the index value i ranging from 0 to 19, f is determined by inverting b (NOT b), logically ANDing inverted variable b with d, and then logically ORing the result with variables b and c logically ANDed together. It is appreciated that although these are relatively simple Boolean operations, that multiple micro-ops may be needed to determine the output variable f. For example, a first micro-op may be used for determining "b AND c" and temporarily storing the result, say as temporary variable x. A second micro-op may be used for determining "NOTb AND d" and temporarily storing the result, say as temporary variable z. Finally, a third micro-op may be used to logically OR the temporary variables x and z to output the result for variable f. Each of the remaining cases are similar. The different variables for k may be temporarily stored and may not require a separate micro-op. Once f and k are determined, a first micro-op may be needed to left rotate variable a, and then at least one additional micro-op may be needed to add the variables a (rotated), f, e, k and w[1] to achieve the final result for temp.

In summary, each of the four cases and the final temp variable determination may require at least 4 micro-ops to determine the variable temp in the standard configuration for each iteration based on the index value i.

Instead, each of the four if/then/else cases are replaced by a corresponding one of four relatively simple UDIs, shown as UDI1, UDI2, UDI3 and UDI4, respectively. Each of these instructions UDI1-UDI4 have variables b, c and d as inputs and f and k as outputs. The determination for temp is replaced by a single UDI shown as UDI5. As shown by the replacement program 1603, each of the if/then/else cases are performed by a single UDI replacement instruction and the final temp determination is another UDI instruction, for a total of two UDI instructions for any given iteration. In many, if not most configurations, the replacement of the x86 Boolean micro-ops with corresponding user defined instructions accelerates operation, so that the same function is performed in less time by the programmed processing operation.

Figure 17:
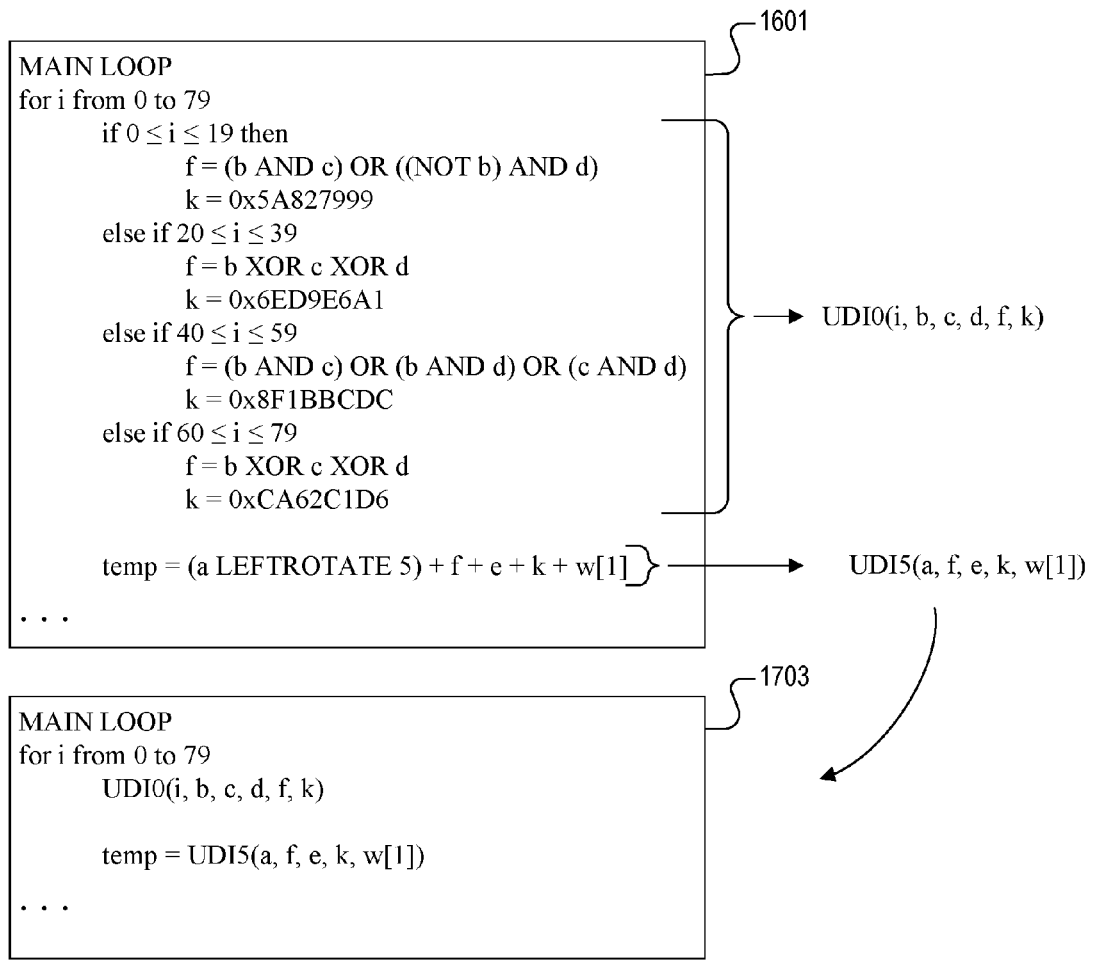
FIG. 17 is a simplified example of replacing standard code in a routine of the application program with UDIs according to another embodiment of the present invention to provide a replacement application program using the UDIs.

FIG. 17 is a simplified example of replacing standard code in a routine of the application program 1601 with UDIs according to another embodiment of the present invention to provide a replacement application program 1703 using the UDIs. The initial application program 1601 is the same with the identical four if/then/else cases and the temp determination. In this case, however, the entire if/then/else code is replaced by a single UDI shown as UDI0. The index value i is incorporated into the UDI0 instruction as another input variable, resulting in UDI0 (i, b, c, d, f, k) for receiving i, b, c and d as input variables and providing f and k as output variables. The instruction UDI5 is provided in the same manner for determining the variable temp in the loop.

The processing operation of the instruction UDI0 used by the replacement application program 1703 is somewhat more complex than any of the processing operations of the instructions UDI1-UDI4 of the replacement application program 1603, but not significantly more complex than the combination of the instructions UDI1-UDI4. In one embodiment, for example, the processing operation programming for each of the four if/then/else cases may be substantially similar if not exactly the same. For the single instruction UDI0, an additional programmed processing operation receives the index value i to select from among the four programmed outputs of the four separate cases to provide the final result. The additional instruction UDI5 is the same as for the replacement application program 1603.

It is appreciated that only two UDIs, UDI0 and UDI5 are executed by the PEU for each iteration of the loop. Furthermore, although not readily apparent, the replacement application program 1703 provides a substantial advantage over the replacement application program 1603 in that the conditional branches of the loop kernel are completely eliminated. The single UDI0 instruction instructs the PEU to combine all of the i conditional inputs in parallel in which the intermediate results are MUXed together to provide a single final result. In this manner, it is appreciated that the replacement application program 1703 provides substantial efficiency improvement and acceleration as compared to the initial application program 1601 and even the replacement application program 1603.

The foregoing description has been presented to enable one of ordinary skill in the art to make and use the present invention as provided within the context of a particular application and its requirements. Although the present invention has been described in considerable detail with reference to certain preferred versions thereof, other versions and variations are possible and contemplated. Various modifications to the preferred embodiments will be apparent to one skilled in the art, and the general principles defined herein may be applied to other embodiments. For example, the circuits described herein may be implemented in any suitable manner including logic devices or circuitry or the like.

Those skilled in the art should appreciate that they can readily use the disclosed conception and specific embodiments as a basis for designing or modifying other structures for carrying out the same purposes of the present invention without departing from the spirit and scope of the invention. Therefore, the present invention is not intended to be limited to the particular embodiments shown and described herein, but is to be accorded the widest scope consistent with the principles and novel features herein disclosed.

The invention claimed is:

1. A compiler system for converting an application source program into an executable program according to a predetermined instruction set architecture (ISA) that is executable by a general purpose processor implemented according to the predetermined ISA, in which the processor includes a programmable execution unit (PEU) that is programmable to execute a specified user-defined instruction (UDI) received by the processor for execution, said compiler system comprising:
a PEU programming tool that converts a functional description of a processing operation to be performed by the PEU of the processor into programming information for programming the PEU to perform the processing operation in response to the specified UDI; and
a compiler that converts the application source program into the executable program, wherein said compiler comprises at least one optimization routine that represents a portion of the application source program with the specified UDI and that inserts the UDI into the executable program, and that further inserts into the executable program a UDI load instruction that specifies the UDI and said programming information,
wherein the programming information comprises a latency statement indicating the latency of the processing operation by a number of clock cycles to complete the processing operation,
wherein the processor further includes a UDI loader and an ISA table, the UDI loader programming the PEU for the specified UDI in response to the UDI load instruction by accessing the programming information, wherein the UDI loader accesses the programming information by a programming information address field corresponding to the specified UDI in the ISA table that points to a location of the programming information in memory.

2. The compiler system of claim 1, wherein said compiler consults said PEU programming tool to incorporate the UDI and corresponding programming information into the executable program.

3. The compiler system of claim 1, wherein said compiler uses said at least one optimization routine to generate said functional description of a processing operation.

4. The compiler system of claim 1, wherein said executable program includes a standard program that only includes instructions from the predetermined ISA and that does not include the specified UDI, and wherein said executable program further includes a custom program that includes the specified UDI and said programming information.

5. The compiler system of claim 1, wherein said compiler incorporates said programming information as UDI information into the application source program to provide a modified application source program, and then compiles said modified application source program into the executable program.

6. The compiler system of claim 1, wherein said PEU programming tool generates an output comprising UDI definitions and corresponding programming information, and wherein said compiler incorporates said output of said PEU programming tool as UDI information into the application source program to provide a modified application source program, and then compiles said modified application source program into the executable program.

7. The compiler system of claim 6, wherein said output of said PEU programming tool comprises a header file.

8. The compiler system of claim 1, wherein said compiler links to said programming information during compilation of the application source program into the executable program.

9. The compiler system of claim 1, wherein said PEU programming tool generates an output comprising UDI definitions and corresponding programming information, and wherein said compiler links to said output of said PEU programming tool during compilation of the application source program into the executable program.

10. The compiler system of claim 9, wherein said output of said PEU programming tool comprises a header file.

11. A method of compiling an application source program into an executable program according to a predetermined instruction set architecture (ISA) that is executable by a general purpose processor implemented according to the predetermined ISA, in which the processor includes a programmable execution unit (PEU) that is programmable to execute a specified user-defined instruction (UDI) received by the processor for execution, said method comprising:
converting a functional description of a processing operation to be performed by the PEU of the processor into programming information for programming the PEU to perform the processing operation in response to the specified UDI; and
compiling the application source program into the executable program, including representing a portion of the application source program with the specified UDI, inserting the UDI into the executable program, and further inserting into the executable program a UDI load instruction that specifies the UDI and the programming information,
wherein the programming information comprises a latency statement indicating the latency of the processing operation by a number of clock cycles to complete the processing operation,
wherein the processor further includes a UDI loader and an ISA table, the UDI loader programming the PEU for the specified UDI in response to the UDI load instruction by accessing the programming information, wherein the UDI loader accesses the programming information by a programming information address field corresponding to the specified UDI in the ISA table that points to a location of the programming information in memory.

12. The method of claim 11, wherein said converting a functional description of a processing operation comprises consulting a PEU programming tool.

13. The method of claim 11, wherein said compiling the application source program comprises using at least one optimization routine to generate the functional description of the processing operation.

14. The method of claim 11, wherein said compiling the application source program into the executable program includes compiling the application source program into a standard program that only includes instructions from the predetermined ISA and that does not include the specified UDI, and compiling the application source program into a custom program that includes the specified UDI and the programming information.

15. The method of claim 11, wherein said compiling the application source program into the executable program comprises incorporating the programming information as UDI information into the application source program to provide a modified application source program, and then compiling the modified application source program into the executable program.

16. The method of claim 11, wherein said converting comprises generating an output comprising UDI definitions and corresponding programming information, and wherein said compiling comprises incorporating the output as UDI information into the application source program to provide a modified application source program, and then compiling the modified application source program into the executable program.

17. The method of claim 16, wherein said generating an output comprises generating a header file.

18. The method of claim 11, wherein said compiling comprises linking to the programming information while compiling the application source program into the executable program.

19. The method of claim 11, wherein said converting comprises generating an output comprising UDI definitions and corresponding programming information, and wherein said compiling comprises linking to the output while compiling the application source program into the executable program.

20. The method of claim 19, wherein said generating an output comprises generating a header file.

* * * * *